United States Patent
Kitahara et al.

(10) Patent No.: US 8,189,431 B2
(45) Date of Patent: May 29, 2012

(54) PIEZOELECTRIC DRIVE DEVICE AND ELECTRONIC DEVICE

(75) Inventors: Joji Kitahara, Shiojiri (JP); Kohei Ohara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 225 days.

(21) Appl. No.: 12/686,844

(22) Filed: Jan. 13, 2010

(65) Prior Publication Data

US 2010/0177603 A1 Jul. 15, 2010

(30) Foreign Application Priority Data

Jan. 14, 2009 (JP) ................................ 2009-005616
Nov. 30, 2009 (JP) ................................ 2009-271567

(51) Int. Cl.
*G04B 19/02* (2006.01)
(52) U.S. Cl. ......................................... 368/220; 368/80
(58) Field of Classification Search ................. 368/80, 368/220
See application file for complete search history.

(56) References Cited

U.S. PATENT DOCUMENTS

| | | | |
|---|---|---|---|
| 3,049,862 A * | 8/1962 | Tokita et al. ................ | 368/149 |
| 6,266,296 B1 | 7/2001 | Miyazawa | |
| 6,885,615 B1 | 4/2005 | Miyazawa et al. | |
| 7,119,476 B2 | 10/2006 | Nagahama | |
| 7,247,970 B2 | 7/2007 | Matsuzaki et al. | |
| 7,473,027 B2 * | 1/2009 | Goeller ........................ | 368/124 |
| 7,922,385 B2 * | 4/2011 | Nagao ........................... | 368/128 |
| 2008/0212415 A1 | 9/2008 | Nagao | |

FOREIGN PATENT DOCUMENTS

| | | |
|---|---|---|
| CA | 2605937 A1 | 8/2006 |
| DE | 818024 C | 10/1951 |
| DE | 102004056989 A1 | 6/2006 |
| EP | 1526634 A1 | 4/2005 |
| EP | 1818735 A1 | 2/2006 |
| EP | 1612922 B1 | 7/2008 |
| EP | 1962310 A1 | 8/2008 |
| EP | 1965449 A2 | 9/2008 |
| JP | 10-290579 A | 10/1998 |
| JP | 2006-20445 A | 1/2006 |
| JP | 2006-33912 A | 2/2006 |
| JP | 2008-245505 A | 10/2008 |

OTHER PUBLICATIONS

Extended European Search Report dated Apr. 7, 2011 for the counterpart European Patent Application No. 10150363.9.

* cited by examiner

*Primary Examiner* — Sean Kayes
(74) *Attorney, Agent, or Firm* — Global IP Counselors, LLP

(57) ABSTRACT

A piezoelectric drive device includes a piezoelectric actuator and a rotation transfer device. The piezoelectric actuator includes a vibrator and a rotor that is rotated in one specific direction by the vibrator. The rotation transfer device transmits rotational energy from the rotor to a driven rotating body, and includes an elastic device that stores rotational energy and a rotation limiting device having a drive wheel and a driven wheel. The rotation transfer device allows the driven wheel to rotate a specific angle, and restricts driving the drive wheel. The elastic device and the rotation limiting device are disposed so that rotational energy transmitted from the rotor is transmitted through one to the other of the elastic device and the rotation limiting device. The rotor, the elastic device, and the rotation limiting device render a serial path for transmitting rotational energy.

12 Claims, 11 Drawing Sheets

PIEZOELECTRIC DRIVE DEVICE AND ELECTRONIC DEVICE

BACKGROUND

1. Technical Field

The present invention relates to a piezoelectric drive device having a piezoelectric actuator, and to an electronic device.

2. Related Art

Piezoelectric drive devices using piezoelectric devices that are resistant to the effects of magnetic fields, and are used as a drive device for driving the hands of an analog timepiece, for example, are known from the literature. See, for example, Japanese Unexamined Patent Appl. Pub. JP-A-2008-245505.

The piezoelectric drive device taught in JP-A-2008-245505 has a piezoelectric actuator that has a piezoelectric element and a rotor that is rotationally driven by the piezoelectric element, a spiral spring that can store the drive power of the piezoelectric actuator as elastic energy, and a second rotor transfer wheel that is rotated by the elastic energy stored by the spiral spring.

With this piezoelectric drive device, rotation of the second rotor transfer wheel starts after the drive power of the piezoelectric actuator is stored as elastic energy by the spiral spring when the piezoelectric actuator is activated. As a result, a piezoelectric actuator is not subject to the load imposed by the inertial moments of the second rotor transfer wheel, the hand wheels, and the hands, the starting load is reduced, and the piezoelectric actuator can be driven with little power.

In addition, this piezoelectric drive device has a rotation limiting device that limits the angle of rotation of a driven rotating body to a specified angle, a first transfer path whereby the rotational energy of the rotor is transmitted to the rotation limiting device without passing through the elastic device, and a second transfer path whereby the rotational energy of the rotor is transmitted to the elastic device.

However, because the piezoelectric actuator is not subject to the load of the inertial moments of the wheels and other parts that are driven by the spiral spring with this piezoelectric drive device, the starting load of the piezoelectric actuator is reduced, but the elastic energy must be stored in the spiral spring on the second transfer path until the rotation limiting device on the first transfer path is released at startup, and a load is therefore always applied to the piezoelectric actuator when the piezoelectric actuator starts operating.

As a result, even when the load of the inertial moments of the hands is low because the hands are small, for example, a constant load is applied to the piezoelectric actuator until the rotation limiting device is released, and power consumption thus increases.

Another problem is that the timing of the first transfer path and the second transfer path must be matched, thus imposing design limitations.

SUMMARY

A piezoelectric drive device and an electronic device according to the present invention can drive with little power and eliminate the foregoing design limitations.

A first aspect of the invention is a piezoelectric drive device including a piezoelectric actuator including a vibrator having piezoelectric element, and a rotor that is rotated in one specific direction by the vibrator; and a rotation transfer device that transmits rotational energy from the rotor to a driven rotating body, includes an elastic device that can store rotational energy transmitted from the rotor as elastic energy, and a rotation limiting device that has a drive wheel and a driven wheel that rotates in conjunction with rotation of the drive wheel, allows the driven wheel to rotate a specific angle in conjunction with rotation of the drive wheel, and restricts driving the drive wheel from the driven wheel when the driven wheel rotates this specific angle. The elastic device and the rotation limiting device are disposed so that rotational energy transmitted from the rotor is transmitted through one to the other of the elastic device and the rotation limiting device; and the rotor, the elastic device, and the rotation limiting device render a serial path for transmitting rotational energy.

Note that the elastic device and the rotation limiting device may be connected in series to the rotor, or may be connected directly to the rotor, so that rotational energy is transmitted in series.

The vibrator oscillates when at least a drive signal is applied to a piezoelectric element, and is configured so that the resulting vibration causes the rotor to rotate in one specific direction. For example, the vibrator may be configured to make the rotor rotate by causing the piezoelectric element itself to oscillate, or it may be configured to make the rotor rotate by causing a laminated structure having flat piezoelectric elements disposed with a reinforcing plate therebetween to oscillate.

In addition, the rotor rotating in one specific direction means that when the rotor can rotate in a first direction and a second direction that is opposite the first direction, the rotor rotates in whichever one of the first direction and the second direction is set as the one specific direction.

Note that the driven rotating body that is driven by the piezoelectric drive device according to the invention may be any body that is rotationally driven by the rotation of the rotor transferred through the elastic device and the rotation limiting device. For example, when the piezoelectric drive device according to the invention is used as the drive device for an analog timepiece, the hands including the hour hand and minute hand, and the hour wheel and minute wheel to which the hands are attached, are driven rotating bodies.

Note, further, that rotational energy as used herein includes torque, and elastic energy includes elastic force.

Furthermore, the elastic device and the rotation limiting device being disposed so that rotational energy transmitted from the rotor is transmitted through one to the other of the elastic device and the rotation limiting device, and the rotor, the elastic device, and the rotation limiting device rendering a serial path for transmitting rotational energy, means that the rotor, the elastic device, and the rotation limiting device are disposed on the same path (serial path) as the path through which the rotational energy is transmitted. More specifically, examples of such serial configurations include the rotor, the elastic device, and the rotation limiting device being disposed in series so that the rotational energy is transmitted from the rotor through the elastic device to the rotation limiting device, and the rotational energy being transmitted from the rotor through the rotation limiting device to the elastic device.

When the piezoelectric actuator is started from a stopped state in this aspect of the invention, driven rotating bodies with a relatively large inertial moment, such as hands, are not directly rotated by the piezoelectric actuator because an elastic device is disposed to the rotation transfer device. Therefore, the inertial moment of the parts that are rotated directly by the piezoelectric actuator can be reduced by the inertial moments of the driven rotating bodies. As a result, the starting load of the piezoelectric actuator can be reduced and starting performance improved, and power consumption can be reduced. In addition, because the piezoelectric actuator drive time can be shortened when the driven rotating body is rotated only the specific angle, the drive signal supply time can also be shortened, and driving with low power is possible while also improving starting performance.

When the driven rotating body is made to rotate only a specific angle, the angle of rotation of the driven wheel can be limited to a specific angle by the rotation limiting device if the rotor is rotated at least the specific angle. More specifically, by using a rotation limiting device, the invention can hold the angle of rotation of the driven wheel constant while continuing to transfer rotational energy. The angle of rotation of the driven rotating body that rotates based on rotation of the driven wheel can therefore also be made constant.

Furthermore, because the rotor is rotated in one specific direction by the vibrator, the elastic energy transmitted from the rotor is stored in the same one specific direction, and the elastic device can easily and efficiently store the elastic energy.

Yet further, when the rotor is turned by the vibrator in the one specific direction and the direction opposite thereto, and the drive wheel is also turned in both directions, setting the position of the driven wheel in the direction of rotation becomes more difficult because of the backlash in the meshing of the drive wheel and the driven wheel. However, because the rotor turns in one specific direction and after turning is stopped by the vibrator in the invention, there is no such backlash effect and the angle of rotation of the drive wheel is therefore stable. As a result, the driven wheel can be reliably turned a specific angle, and the driven wheel can simultaneously be reliably prevented from turning the drive wheel.

Furthermore, because the rotor, the elastic device, and the rotation limiting device are disposed on the same path as the rotational energy transfer path of the rotor in the rotation transfer device, there is no need to match the timing of the first transfer path and the second transfer path as required with the related art taught in JP-A-2008-245505, the attendant design limitations can be eliminated, and the piezoelectric drive device can be easily designed and manufactured. In addition, because rotation of the drive wheel is not particularly restricted when the piezoelectric actuator starts, the load applied when the piezoelectric actuator starts can be reduced compared with the configuration taught in JP-A-2008-245505, and power consumption can be reduced accordingly.

Furthermore, because moving the hands at a constant interval is extremely important when the hands of a timepiece, for example, are driven by a piezoelectric actuator, the positions of the hands will shift and great problems can result if the piezoelectric drive device using a piezoelectric actuator cannot move the hands in steps of a constant angle.

With this embodiment of the invention, the rotation of the driven rotating body is always constant because the driven rotating body is limited to turning a specific angle of rotation by the rotation limiting device while the driven rotating body is rotated by rotor drive. Because overrun of the driven rotating body that is rotated by the piezoelectric actuator can thus be prevented, precisely controlling the angle of rotation of the rotor is not necessary, the precision of the angle of rotation of the driven rotating body can be improved, and the display precision of the hands or other display means that is rotated by the driven rotating body can be improved.

Furthermore, a rotation limiting device that can transmit rotational energy from a drive wheel to a driven wheel, and can prohibit the drive wheel being driven from the driven wheel side when the driven wheel rotates the specific angle in conjunction with rotation of the drive wheel, can normally be achieved by a Geneva gear mechanism or other type of non-reversing gear transfer mechanism. A non-reversing gear transfer mechanism such as a Geneva mechanism can transmit rotation from the drive wheel to the driven wheel, but reverse transfer of rotation from the driven wheel to the drive wheel is extremely inefficient and is normally not possible.

Therefore, by using a non-reversing gear transfer mechanism that thus inefficiently transmits rotation from the driven wheel to the drive wheel as the rotation limiting device, the invention can prohibit transfer of drive power from the driven wheel to the drive wheel when the driven wheel has rotated a specific angle. As a result, when the hands are subject to shock, such as by dropping the timepiece, torque from the hands is stopped by the rotation limiting device between the driven wheel and the drive wheel, and is prevented from being transferred to the rotor side. As a result, when the timepiece is dropped, the hands can be prevented from being moved by the force of the shock.

In a piezoelectric drive device according to another aspect of the invention, the rotational energy of the rotor is transmitted to the elastic device and stored as elastic energy, and the drive wheel of the rotation limiting device is rotationally driven by transfer of elastic energy stored in the elastic device.

If the elastic device is disposed between the piezoelectric actuator and the rotation limiting device, the load of the inertial moments of rotating parts downstream from the driven wheel, including the driven wheel of the rotation limiting device, and the bearing load of those parts, can be removed from the load applied to the piezoelectric actuator when starting. As a result, the startup load on the piezoelectric actuator can be reduced, and power consumption can be reduced accordingly.

Furthermore, when a driven rotating body turns as a result of being dropped, for example, rotation (shock) from the driven rotating body can be received by the rotation limiting device without passing through the elastic device. As a result, high elastic force is not required in the elastic device, the load from the elastic device can be reduced when the piezoelectric actuator starts, and the piezoelectric drive device can be driven with low power.

A piezoelectric drive device according to another aspect of the invention also has a rotation detection wheel disposed between the rotor and the elastic device; a rotation detection device that detects if the rotation detection wheel has rotated a specific angle; and a drive control device that stops output of drive signals that drive the piezoelectric actuator when the rotation detection device detects that the rotation detection wheel has turned a specific angle after piezoelectric actuator drive starts.

The rotation detection device may detect rotation of the rotation detection wheel continuously or intermittently.

When the rotation detection wheel is disposed downstream of the elastic device in the rotational energy transfer path, for example, the rotation detection wheel detects rotation after a certain amount of elastic energy has been stored in the elastic device. In other words, the rotation detection wheel does not rotate until a specific amount of elastic energy has been stored in the elastic device after the rotor starts rotating. As a result, the rotation detection wheel does not rotate even of the rotor has rotated the specific angle, the rotation detection wheel starts rotating after a specific amount of elastic energy has been stored, and when the rotation detection device detects rotation of the rotation detection wheel to the specified position, the rotor that has continued rotating to that point may have rotated greater than the specific angle. More specifically, it is possible for the rotor to rotate too much.

Because excessive elastic energy will be stored in the elastic device due to excessive rotation of the rotor in this situation, it is possible that the drive wheel of the rotation limiting device is made to rotate more than the specified angle, and the driven rotating body is made to rotate passed the specified position. For example, when the driven rotating bodies are hands for indicating the time, the time may not be displayed accurately.

However, because the rotation detection wheel is disposed between the rotor and the elastic device in the invention, the rotation detection device can accurately detect the the specific angle of rotation of the rotor, and can therefore accurately store only a specific amount of elastic energy in the elastic device. As a result, because the drive wheel of the rotation limiting device is driven only a specific angle, and the driven wheel is also driven to a specific position, by releasing a specific amount of elastic energy stored in the elastic device, the driven rotating body can also be accurately driven to a specific position. Therefore, when the driven rotating bodies are hands for indicating the time, for example, the time can be displayed accurately.

In a piezoelectric drive device according to another aspect of the invention the rotation detection wheel is a wheel that accelerates rotation of the rotor.

Acceleration as used herein refers to rotation of a second wheel based on rotation of a first wheel, and means the angle of rotation rotated by the second wheel is greater than the angle of rotation rotated by the first wheel.

Because the rotation detection wheel is a wheel that accelerates rotation of the rotor in this aspect of the invention, the rotation angle of the rotation detection wheel can be large even when the rotation angle of the rotor is small, and rotation of the rotation detection wheel can be easily detected. For example, if the acceleration ratio from rotation of the rotor to the rotation detection wheel is six times, the rotation detection wheel will rotate 45 degrees when the rotor rotates 7.5 degrees, for example. Directly detecting if the rotor has rotated 7.5 degrees requires good precision because of the small angle of rotation, and is accordingly difficult. However, because rotation is detected by an accelerated rotation detection wheel, the rotor rotation detection accuracy of the rotation detection device can be improved. Driving the piezoelectric actuator by means of the drive control device can therefore be controlled with good precision.

In a piezoelectric drive device according to another aspect of the invention, a speed-increasing wheel train is disposed between the rotor and the rotation limiting device, and rotation of the rotor is accelerated by the speed-increasing wheel train and transmitted to the rotation limiting device; and a speed-reducing wheel train is disposed between the rotation limiting device and the driven rotating body, and rotation of the driven wheel of the rotation limiting device is slowed by the speed-reducing wheel train and transmitted to the driven rotating body.

In this aspect of the invention rotation of the rotor is accelerated by the speed-increasing wheel train and transmitted to the rotation limiting device (drive wheel), and is then reduced by the speed-reducing wheel train from the rotation limiting device (driven wheel) and transferred to the driven rotating body. The driven wheel of the rotation limiting device rotates in conjunction with rotation of the drive wheel. This speed-increasing wheel train refers to the wheel train that increases speed as described above.

Because the drive wheel rotates faster than the rotor and has a larger angle of rotation, and a large limiting range can be assured on the drive wheel for limiting rotation of the driven wheel, rotation of the driven wheel can be easily and reliably limited.

For example, even if the rotational angle of the rotor is small, the drive wheel can rotate through a large angle of rotation of 180 degrees. Of this 180 degree angle of rotation of the drive wheel, a 120 degree range is the limiting range in which the driven wheel does not turn, and the remaining 60 degree range may be the driving range in which the driven wheel turns. If thus configured and the drive wheel rotates more than the 60 degree driving range in which the driven wheel turns, the driven wheel can be rotated a specific angle even if there is some deviation in the amount of rotation in the limiting range. More specifically, by providing a relatively large limiting range, the driven wheel can be rotated a specific angle without being affected by variation in the drive wheel.

Furthermore, because rotation from the rotor is accelerated and transmitted to the drive wheel of the rotation limiting device in the invention, even if the drive wheel rotates 180 degrees, the rotor can have a small angle of rotation determined by the speed-increasing gear ratio. If the angle of rotation of the rotor can be small, the drive time of the piezoelectric actuator can also be shortened, and power consumption can be reduced accordingly.

Furthermore, because the output of the driven wheel of the rotation limiting device is slowed by the speed-reducing wheel train, the gear ratio of the speed-increasing wheel train can be easily set with consideration for the piezoelectric actuator drive time and drive wheel rotation (angle of rotation) irrespective of the speed of the driven rotating body.

In a piezoelectric drive device according to another aspect of the invention, the rotation limiting device is rendered by a non-reversing gear transfer device that does not transfer rotation from the driven wheel to the drive wheel; and the non-reversing gear transfer device is a Geneva mechanism including a Geneva drive wheel and a Geneva driven wheel.

Because this aspect of the invention renders the rotation limiting device using a Geneva gear device, the configuration of the rotation limiting device can be simplified and the parts count reduced. In addition, if a Geneva mechanism is used, the hands, for example, can be accurately driven an angle of rotation equal to one step without being affected by variations in the angle of rotation of the rotor when the driven rotating body is moved intermittently.

In a piezoelectric drive device according to another aspect of the invention, the Geneva drive wheel has a finger that engages a tooth of the Geneva driven wheel and causes the Geneva driven wheel to rotate, and a limiting part that is contacted by a tooth of the Geneva driven wheel and stops the Geneva driven wheel from rotating. A driving range in which the finger contacts a tooth of the Geneva driven wheel and causes the Geneva driven wheel to rotate, and a limiting range in which the limiting part contacts a tooth of the Geneva driven wheel and stops rotation of the Geneva driven wheel, are disposed in the rotational range of the Geneva drive wheel. The limiting range is set to an angle of rotation range that is greater than or equal to the driving range.

Because a relatively large limiting range can be disposed to the Geneva drive wheel in this aspect of the invention, the drive wheel can be prevented from exceeding the limiting range and jumping to the next driving range even if drive wheel rotation overruns due to the inertia of the rotating rotor or residual vibration after the vibrator is stopped. As a result, driving the piezoelectric actuator can be easily controlled so that the Geneva driven wheel rotates only a specific angle.

In a piezoelectric drive device according to another aspect of the invention, the elastic device has a spiral spring.

The spiral spring may be a hairspring or a main spring such as used in timepieces.

Because the elastic device has a spiral spring in this aspect of the invention, the spiral spring can be provided without particularly increasing the installation space compared with a configuration that uses a U-shaped spring or cantilever spring even if the number of winds in the spiral spring is increased to assure a large displacement. In addition, if a large displacement is assured, substantially constant elastic energy can be produced irrespective of the displacement of the elastic device. Therefore, because the driven rotating body receives substantially constant elastic energy from the elastic device irrespective of the size of any external shock, operation of the driven rotating body can be stabilized.

In a piezoelectric drive device according to another aspect of the invention, the rotation transfer device has a rotor transfer wheel to which rotation is transmitted from the rotor; the rotor transfer wheel and the drive wheel of the rotation limiting device are disposed to the same rotating shaft; and one end of the elastic device is engaged with the rotor transfer wheel, and the other end is engaged with the drive wheel.

This aspect of the invention can render the elastic device compactly because the elastic device can be disposed between the rotor transfer wheel and the drive wheel of the rotation limiting device disposed on the same shaft.

Furthermore, if the drive wheel is disposed on top of the rotor wheel disposed coaxially to the rotor, and the elastic device is disposed therebetween, the rotor, the rotor wheel, the elastic device, and the drive wheel will be stacked in the axial direction, and the thickness increases accordingly. However, because the rotor transfer wheel can be disposed on a different shaft than the rotor in this aspect of the invention, only the rotor transfer wheel, elastic device, and drive wheel are stacked together, and the thickness can be reduced by the amount of the rotor.

In a piezoelectric drive device according to another aspect of the invention, the rotation transfer device has a transfer wheel that is disposed on the same rotating shaft as the driven wheel of the rotation limiting device; and one end of the elastic device is engaged with the driven wheel, and the other end is engaged with the transfer wheel.

Because the driven wheel of the rotation limiting device and the transfer wheel of the rotation transfer device are disposed to the same shaft in this aspect of the invention, the elastic device can be compactly disposed when the elastic device is located on the output side of the rotation limiting device.

In a piezoelectric drive device according to another aspect of the invention, the vibrator is preferably flat and has a contact probe that contacts the outside surface of the rotor, and a pressure means that presses either one of the vibrator and rotor to the other of the vibrator and rotor.

The vibrator is not limited to a flat configuration, and may have a diamond, trapezoidal, or parallelogram shape.

Furthermore, the contact probe must be disposed to touch at least the outside surface of the rotor, and may be formed protruding from an end part of a flat vibrator or from a corner part of a flat vibrator.

The pressure means may push the rotor to the vibrator, or push the vibrator to the rotor. The direction of pressure from the pressure means is substantially perpendicular to the rotary shaft of the rotor, and the direction of this pressure and the oscillation direction of the vibrator are preferably on the same plane.

By using a flat vibrator, this aspect of the invention helps render a thinner piezoelectric drive device. In addition, because a pressure means is provided, friction between the contact probe and the outside surface of the rotor can be increased, and drive power can be reliably transferred when the rotor is caused to rotate by vibration of the vibrator.

Another aspect of the invention is an electronic device having the piezoelectric drive device according to the invention, and a driven unit that is driven by the piezoelectric drive device.

This aspect of the invention enables rendering various types of electronic devices that use a piezoelectric drive device as the drive power source. This prevents driving the driven body by means of the piezoelectric drive device being affected by magnetic fields, and can reduce power consumption when driving.

In an electronic device according to another aspect of the invention, the driven unit is a time information display unit that displays time information kept by a timekeeping unit.

Because a time information display unit such as the hands of a timepiece can be driven by a piezoelectric drive device with this aspect of the invention, driving the hands can be prevented from being affected by magnetic fields, and the hands of the time information display unit, for example, can be driven with low power.

Other objects and attainments together with a fuller understanding of the invention will become apparent and appreciated by referring to the following description and claims taken in conjunction with the accompanying drawings.

DESCRIPTION OF EMBODIMENTS

Embodiment 1

Figure 1:
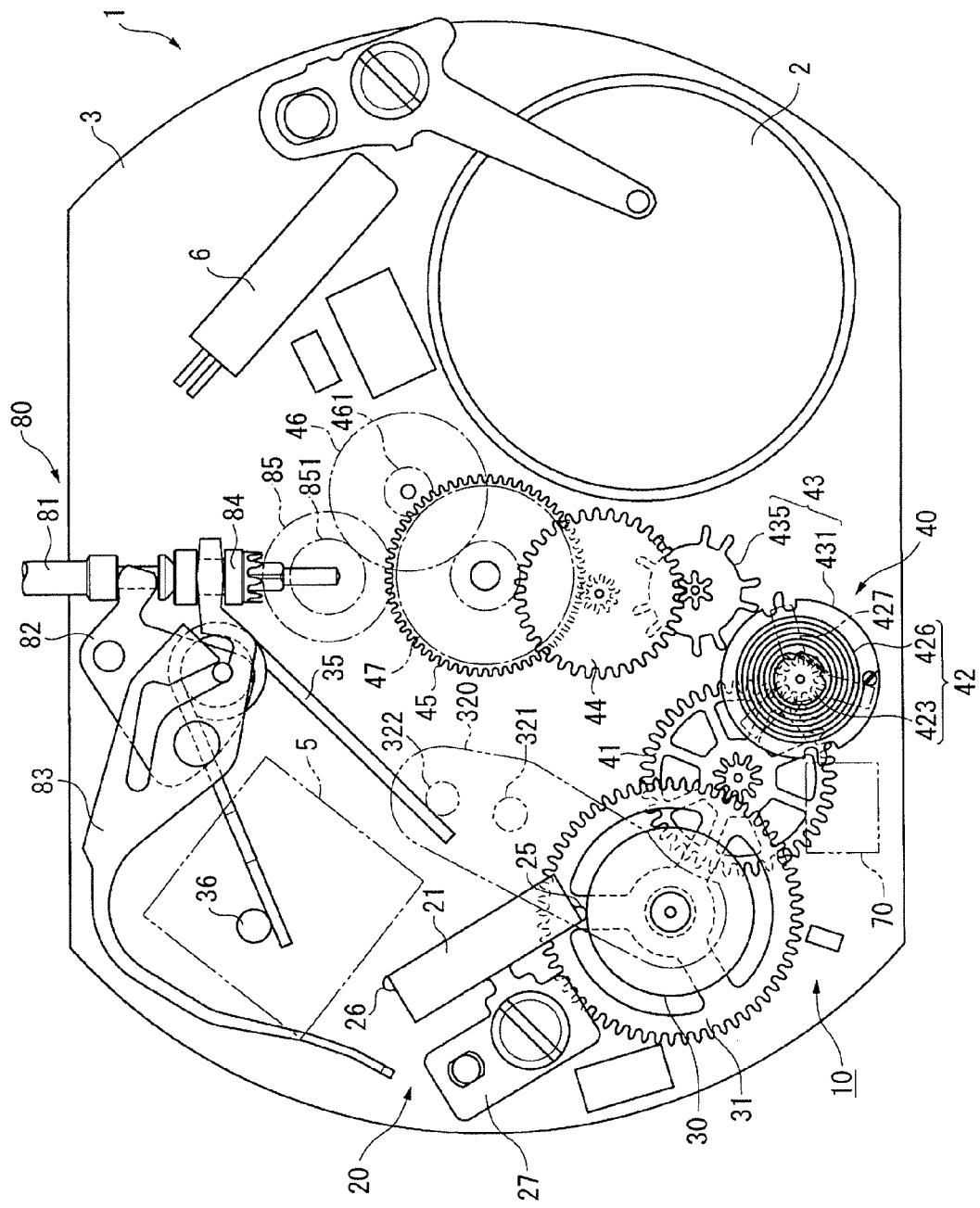
FIG. 1 is a plan view showing the main parts of a timepiece according to a first embodiment of the invention.

A first embodiment of the invention is described next with reference to the accompanying figures.

Note that in the second and third embodiments described below components that are identical to and components that have the same function as components described in the first embodiment are identified by the same reference numerals, and further description thereof is omitted or simplified.

General Configuration

Figure 2:
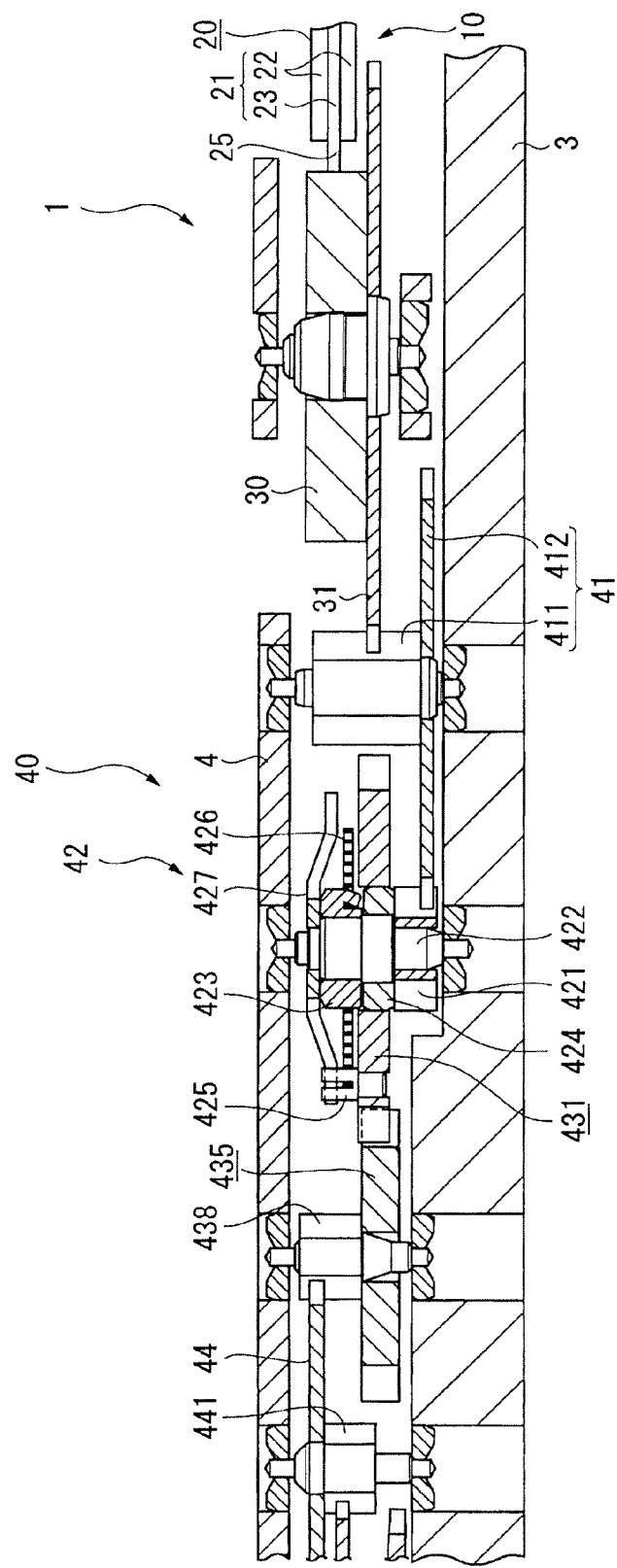
FIG. 2 is a section view showing the rotation transfer device in the first embodiment of the invention.
Figure 3:
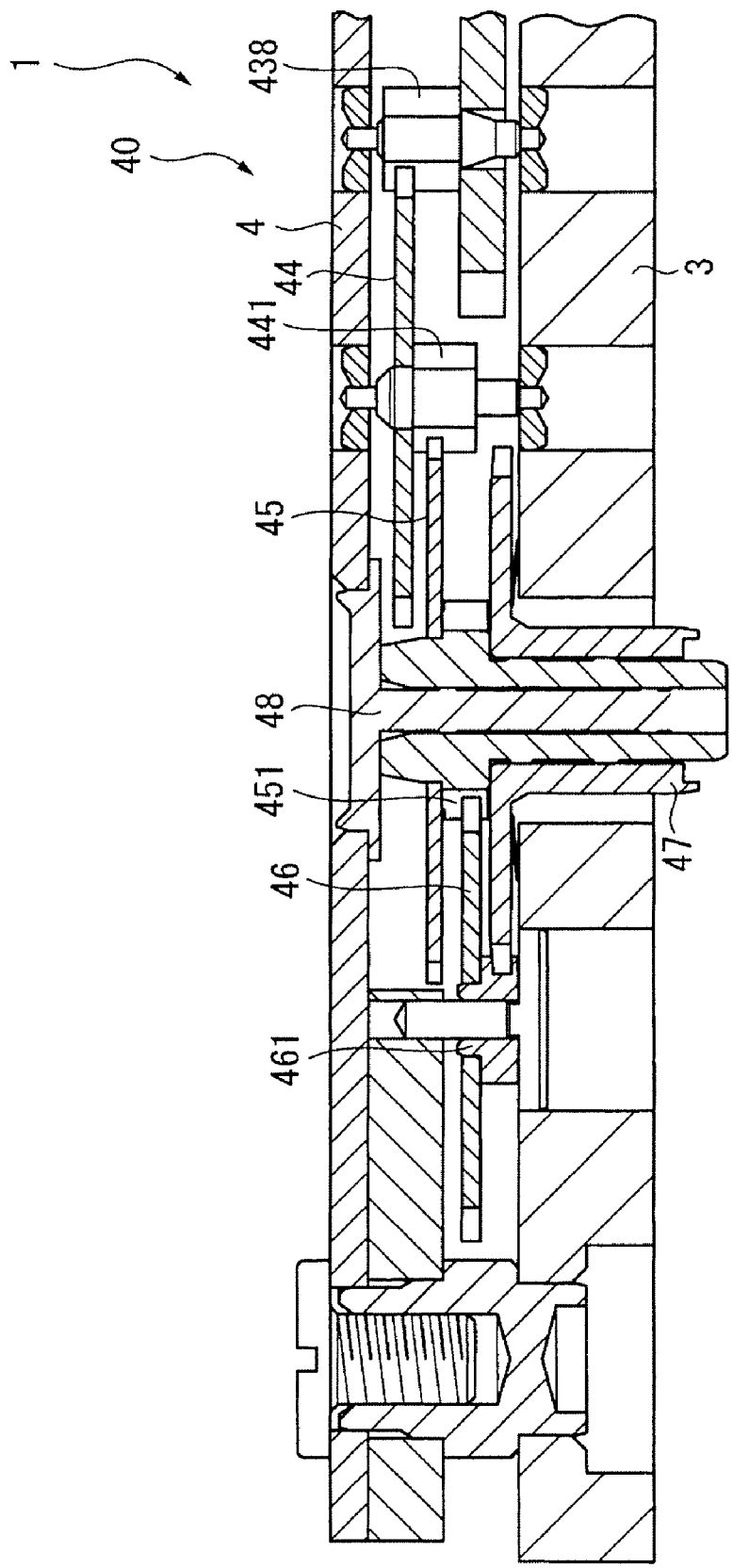
FIG. 3 is a section view showing the rotation transfer device in the first embodiment of the invention.

FIG. 1 is a plan view schematically showing the configuration of an electronic timepiece 1 as an example of an electronic device using a piezoelectric drive device according to this embodiment of the invention. FIG. 2 and FIG. 3 are section views showing selected parts of the configuration.

FIG. 1 is a view from the opposite side of the electronic timepiece 1 to the side on which the time is displayed (the "time display side"), that is, from the back cover side.

Note that when the electronic timepiece 1 is seen as shown in FIG. 1, the direction from the center to the time adjustment mechanism 80 is the 3:00 o'clock side of the electronic timepiece 1; the direction from the center to the rotation transfer device 40 is the 9:00 o'clock side; the opposite direction to the direction from the center to the piezoelectric actuator 20 is the 12:00 o'clock side; and the direction from the center to the piezoelectric actuator 20 is the 6:00 o'clock side.

When seen as shown in FIG. 2 and FIG. 3, the time display side (the main plate 3 side) of the electronic timepiece 1 is down, and the back cover side (the train wheel bridge 4 side) is up.

As shown in FIG. 1, the electronic timepiece 1 includes a piezoelectric drive device 10 that drives hands for displaying the time, a battery 2, an IC chip 5, and a quartz oscillator 6. The IC chip 5 and quartz oscillator 6, for example, are disposed to a circuit board not shown. The battery 2 is held by a battery presser.

Note also that the electronic timepiece 1 according to this embodiment of the invention is a two-hand analog wristwatch having an hour hand and a minute hand as hands for displaying time.

Piezoelectric Drive Device

As shown in FIG. 1 to FIG. 3, the piezoelectric drive device 10 that drives the hands includes a piezoelectric actuator 20, and a rotation transfer device 40 that transfers output from the piezoelectric actuator 20 to the hands, which are driven rotating bodies.

Piezoelectric Actuator

The piezoelectric actuator 20 includes a vibrator 21 and a rotor 30. As shown in FIG. 2, the vibrator 21 has a laminated structure in which two flat, rectangular piezoelectric elements 22 are disposed with a stainless steel reinforcing plate 23 therebetween, the reinforcing plate 23 being thinner than and substantially the same shape as the piezoelectric elements 22.

The piezoelectric elements 22 can be made from a variety of materials including lead zirconate titanate (PZT(R)), quartz, lithium niobate, barium titanate, lead titanate, lead metaniobate, polyvinylidene fluoride, lead zinc niobate, and lead scandium niobate, for example.

The vibrator 21 has a contact probe 25 at the widthwise edge of one short side. This contact probe 25 is formed by cutting or otherwise shaping the reinforcing plate 23, and the gently curving distal end part of the contact probe 25 protrudes from the piezoelectric elements 22. The vibrator 21 is positioned so that the distal end of this contact probe 25 contacts the outside surface of the rotor 30.

Note that because the contact probe 25 is formed eccentrically positioned to the widthwise center of the vibrator 21, the weight is unbalanced widthwise to the vibrator 21, and the piezoelectric actuator 20 can be easily made to produce a bending oscillation.

Note, further, that a contact probe 26 identical to the contact probe 25 is formed on the other short side of the vibrator 21 at a position symmetrical to the plane center of the vibrator 21 so that a bending oscillation can be produced even more easily.

A support unit 27 is formed on one long side of the piezoelectric actuator 20. The support unit 27 is formed in unison with the reinforcing plate 23. This support unit 27 is fastened, for example, to the main plate with a screw.

A circuit board for the piezoelectric elements is also disposed to this support unit 27, and is extended with a wire lead disposed on the surface of the circuit board connected to a drive electrode disposed on the surface of the piezoelectric elements 22 so that the piezoelectric elements 22 can be driven.

Applying a voltage of a specific frequency to the drive electrode of the vibrator 21 excites vibrations in a longitudinal primary vibration mode in which the piezoelectric elements 22 expand and contract lengthwise. Because contact probe 25 and contact probe 26 are disposed at diagonally opposite ends of the vibrator 21, the weight of the vibrator 21 is unbalanced to the longitudinal center line. This imbalance excites vibrations in a bending secondary vibration mode in which the vibrator 21 bends in the direction substantially perpendicular to the length. The vibrator 21 thus produces vibrations combining this longitudinal primary vibration mode and the bending secondary vibration mode, and causes the contact probe 25 to oscillate on a substantially elliptical path.

Rotor

The rotor 30 that is driven by contact with the vibrator 21 is supported freely rotatably by a rotor guide 320. The rotor 30 and rotor guide 320 together render a rotor block. A rotor wheel 31 that rotates in unison with the rotor 30 is also disposed to the rotor 30.

As shown in FIG. 1, the rotor guide 320 is disposed to pivot freely on a pivot pin 321, and one end of a pressure spring 35 used as a pressure means is disposed in contact with a pin 322 disposed to the rotor guide 320.

The other end of this pressure spring 35 is engaged by a stationary pin 36 disposed on the main plate, for example, so that the pressure spring 35 disposed between the stationary pin 36 and the rotor guide 320 deflects and urges the rotor guide 320.

As a result of the rotor guide 320 being urged by the pressure means (pressure spring 35), the rotor 30 contacts the contact probe 25 of the piezoelectric actuator 20 with a specific contact force (contact pressure). As a result, when the vibrator 21 of the piezoelectric actuator 20 vibrates and the contact probe 25 oscillates on a substantially elliptical path, contact of the contact probe 25 with the side of the rotor 30 causes the rotor 30 to turn. In this embodiment of the invention the rotor 30 rotates clockwise as seen in FIG. 1. The one specific direction in which the rotor 30 thus turns in this embodiment of the invention is therefore the clockwise direction in FIG. 1.

Rotation Transfer Device

Figure 4:
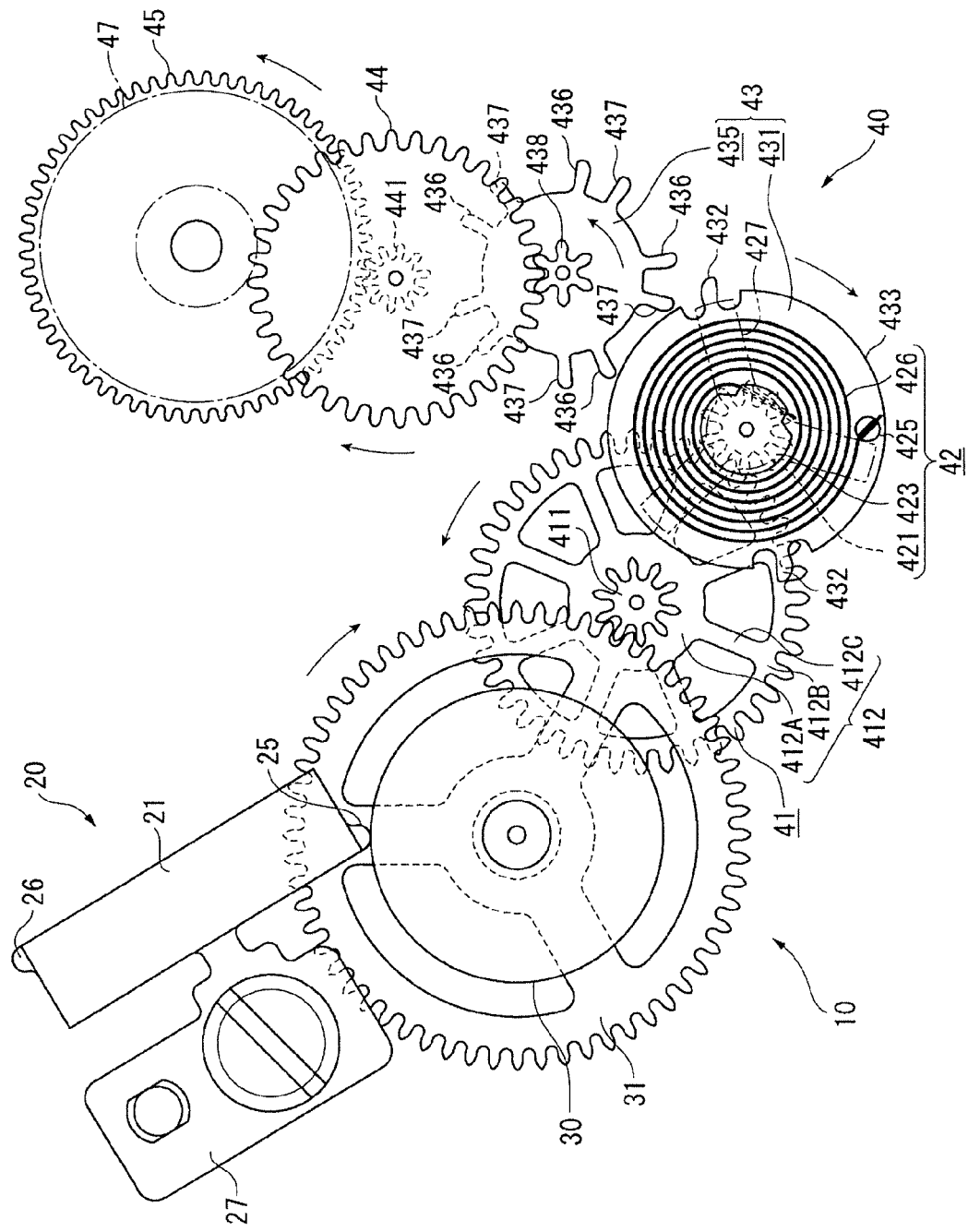
FIG. 4 is a plan view of the rotation transfer device in the first embodiment of the invention.

The rotation transfer device 40 transfers the rotational energy of the rotor 30 to a driven rotating body, and as shown in FIG. 2 to FIG. 4 includes a rotation detection wheel 41, an elastic device 42, a rotation limiting device 43, the third wheel 44, the second wheel 45, the day wheel 46, and hour wheel 47.

Rotation Detection Wheel

The rotation detection wheel 41 includes a pinion 411 that meshes with the rotor wheel 31, and a wheel 412 that rotates in unison with the pinion 411, and is supported freely rotatably by the main plate 3 and train wheel bridge 4.

The wheel 412 has a boss part 412A disposed in the center, an annular rim part 412B disposed around the outside, and a plurality of spoke parts 412C disposed radiating from the boss part 412A to the rim part 412B. Holes are thus formed between the boss part 412A and rim part 412B in the areas between the spoke parts 412C.

Elastic Device

The elastic device 42 includes a pinion 421, a spindle 422, a spring engaging member 423, a bearing ring 424 and engaging pin 425 fastened to the Geneva drive wheel 431 of the rotation limiting device 43, a spiral spring 426, and a cover 427. The Geneva drive wheel 431 is rotatably disposed on the spindle 422 by means of the bearing ring 424 fixed in the center of the Geneva drive wheel 431.

The pinion 421 rotates in unison with the spindle 422, which is supported freely rotatably by the main plate 3 and the train wheel bridge 4, and meshes with the wheel 412 of the rotation detection wheel 41.

The spring engaging member 423 is fit on and rotates in unison with the spindle 422, and is engaged by the inside circumference end of the spiral spring 426. The outside circumference end of the spiral spring 426 is engaged by the engaging pin 425. In this embodiment of the invention a rotor transfer wheel whereby rotation from the rotor 30 is transmitted through the rotation detection wheel 41 is rendered by the pinion 421, spindle 422, and spring engaging member 423 rotating in unison. One end of the spiral spring 426 is engaged by this rotor transfer wheel.

The cover 427 is fixed in a specific plane position to the spindle 422, and prevents the middle of the spiral spring 426 from popping out to the train wheel bridge 4 side. In addition, by being fastened to the spindle 422 in this specific plane position, the side of the cover 427 can meet and position the engaging pin 425 that secures the outside end of the spiral spring 426 as shown in FIG. 4. By thus positioning the engaging pin 425, the elastic force of the spiral spring 426 holds the Geneva drive wheel 431 in a specific rotational position, that is, in the position where the engaging pin 425 meets the side of the cover 427.

The spiral spring 426 is formed by winding thin flat spring stock that is rectangular in section view in a counterclockwise spiral from the center to the outside circumference side as seen in plan view in FIG. 4. The spiral spring 426 is elastically deformed in the direction increasing the number of windings as a result of the pinion 421, spindle 422, and spring engaging member 423 turning clockwise in advance of the Geneva drive wheel 431, and can thus store the drive power transferred to the pinion 421 as elastic energy.

The spiral spring 426 is held by the spring engaging member 423 and the engaging pin 425 when initially deflected (in the initial elastic deformation position). More specifically, the elastic force of this initial deflection is set so that the engaging pin 425 of the Geneva drive wheel 431 reliably contacts the side wall of the cover 427 when the piezoelectric actuator 20 is stopped, that is, when the pinion 421, spindle 422, and cover 427 are stopped. In this position, a tooth 436 and a tooth 437 of the Geneva driven wheel 435 contact the limiting part 433 of the Geneva drive wheel 431, the Geneva driven wheel 435 is positioned in the direction of rotation, and rotation of the Geneva driven wheel 435 is prohibited even if torque is produced from the Geneva driven wheel 435 side. In addition, when the spiral spring 426 is thus initially deflected, the hands can be driven easily even when the hour hand, minute hand, or other hands are heavy (the inertial moment is high).

Rotation Limiting Device

The rotation limiting device 43 is positioned so that rotational energy from the rotor 30 is transmitted through the elastic device 42. More specifically, the rotation limiting device 43 together with the rotor 30 and elastic device 42 render a serial path for transmitting rotational energy from the rotor 30. This rotation limiting device 43 is configured using a Geneva mechanism, which is a non-reversing gear transfer device, and includes a Geneva drive wheel 431 (drive wheel) and a Geneva driven wheel 435 (driven wheel) that is turned by the Geneva drive wheel 431.

The Geneva drive wheel 431 is supported freely rotatably on the spindle 422 by means of the bearing ring 424 affixed in the center. Fingers (teeth) 432 that engage the Geneva driven wheel 435 are disposed symmetrically to the axis of rotation of the Geneva drive wheel 431, that is, at two positions 180 degrees apart in the rotation direction of the Geneva drive wheel 431. The limiting part 433 is rendered by the curved outside circumference surfaces between the two fingers 432. The radius of this limiting part 433 from the center axis is greater than the radius of the base circle of the fingers 432 (teeth), and is smaller than the radius of the tip circle.

The Geneva driven wheel 435 has teeth 436 formed at five places 72 degrees apart in the direction of rotation on the outside circumference, teeth 437 corresponding to each of the teeth 436, and a pinion 438 disposed on the center shaft.

The interval between the teeth 436 and teeth 437 is a small interval of approximately 20 degrees from one tooth 436 to the tooth 437 adjacent thereto in the counter-rotation direction, and a large interval of approximately 50 degrees from the tooth 436 to the tooth 437 adjacent thereto in the direction of rotation.

Figure 5A:
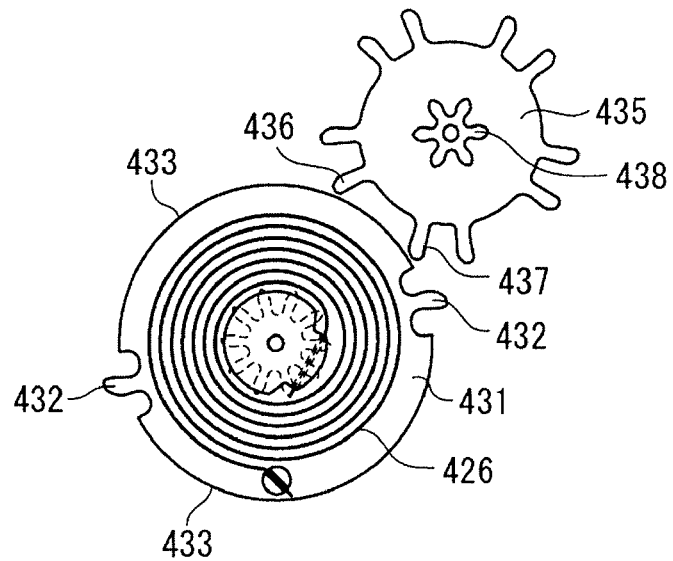
FIG. 5 describes the operation of the Geneva mechanism in the first embodiment of the invention.

As shown in FIG. 5A, when two teeth 437 and 436 on opposite sides of this large gap contact the limiting part 433 of the Geneva drive wheel 431, the Geneva driven wheel 435 cannot turn in either the direction of rotation or the counter-rotation direction. More specifically, the Geneva driven wheel 435 is prevented from turning by means of the Geneva drive wheel 431.

Rotation of the Geneva driven wheel 435 is thus limited until the Geneva drive wheel 431 turns and a finger 432 contacts a tooth 436. In this embodiment of the invention, rotation of the Geneva driven wheel 435 is restricted from the position shown in FIG. 5A until the Geneva drive wheel 431 rotates 120 degrees.

Figure 5B:
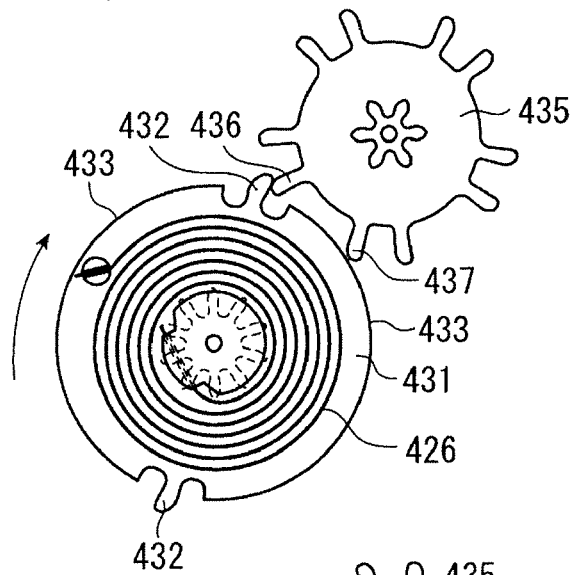
Figure 5C:
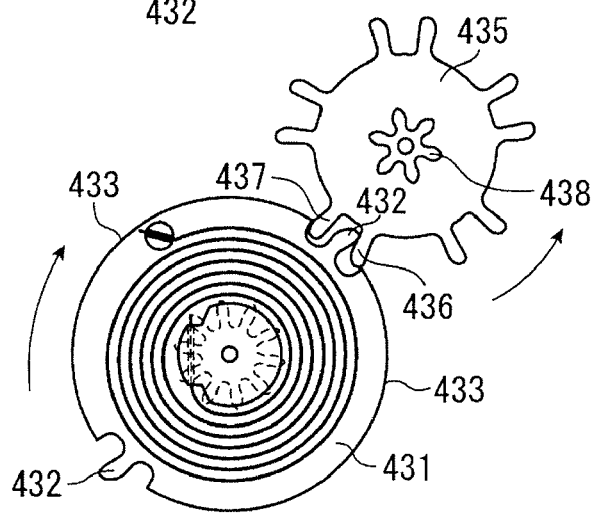

As shown in FIG. 5B, when the Geneva drive wheel 431 rotates further from the position where a finger 432 of the Geneva drive wheel 431 contacts a tooth 436 of the Geneva driven wheel 435, the Geneva driven wheel 435 also rotates in conjunction therewith as shown in FIG. 5C. Rotation of the Geneva driven wheel 435 then stops after returning to the position shown in FIG. 5A.

In this embodiment of the invention, therefore, when the Geneva drive wheel 431 turns 180 degrees, the Geneva driven wheel 435 is prevented from turning through a 120 degree portion of this rotation (rotation-limited range), but during the remaining 60 degrees, the Geneva driven wheel 435 rotates 72 degrees in conjunction with the Geneva drive wheel 431. The Geneva driven wheel 435 thus turns intermittently in conjunction with rotation of the Geneva drive wheel 431.

As described above, rotation of the Geneva drive wheel 431 causes the Geneva driven wheel 435 to turn intermittently, and the angle of rotation of the Geneva driven wheel 435 is set to a specific angle. On the other hand, even if the Geneva driven wheel 435 side turns, this rotation is limited by the Geneva drive wheel 431 and is not transmitted to the Geneva drive wheel 431 side. The Geneva drive wheel 431 and Geneva driven wheel 435 thus render a non-reversing gear transfer device, and render a rotation limiting device whereby the Geneva driven wheel 435 turns a specific angle (72 degrees) in conjunction with rotation of the Geneva drive wheel 431, and driving the Geneva drive wheel 431 from the Geneva driven wheel 435 is prohibited when the Geneva driven wheel 435 has turned this specific angle.

In addition, the fingers 432 are asymmetrical tooth forms having the distal ends thereof sloped in the direction of rotation of the Geneva drive wheel 431. As a result, as shown in FIG. 5B, when the Geneva drive wheel 431 turns in the direction of the arrow in FIG. 5B and contacts a tooth 436 of the Geneva driven wheel 435, the finger 432 pushes the tooth 436 in the rotation direction of the Geneva driven wheel 435, and the Geneva driven wheel 435 is thus driven rotationally.

Furthermore, while the finger 432 contacts a tooth 437 when the Geneva drive wheel 431 turns in the opposite direction, the finger 432 pushes the tooth 437 toward the center of rotation of the Geneva driven wheel 435 because the surface of the distal end of the finger 432 on the opposite side as the side that contacts the tooth 436 in FIG. 5B is sloped, and rotation can therefore not be transmitted to the Geneva driven wheel 435.

Wheels Train Configuration Downstream from the Geneva Driven Wheel

As shown in FIG. 1 to FIG. 4, the pinion 438 of the Geneva driven wheel 435 meshes with the third wheel 44, and the pinion 441 of the third wheel 44 meshes with the second wheel 45. A second pinion 451 is disposed to the second wheel 45, this second pinion 451 meshes with the day wheel 46, and the pinion 461 of the day wheel 46 meshes with the hour wheel 47.

A minute hand not shown is disposed to the distal end of the second pinion 451 of the second wheel 45. An hour hand not shown is attached to the distal end of the hour wheel 47. These wheels 44 to 46 are axially supported on the main plate 3 and train wheel bridge 4.

Note that if a second hand is provided, a fourth wheel and a seconds pinion that rotates in unison with the fourth wheel may be disposed in the second pinion 451 and a second hand attached thereto as in a common timepiece. However, because a second hand is not provided in this embodiment of the invention, a shaft member 48 that supports the second pinion 451 freely rotatably is disposed in the second pinion 451.

Rotation Detection Device

The electronic timepiece 1 according to this embodiment of the invention has a rotation detection device 70 (see FIG. 6) that detects rotation of the rotation detection wheel 41.

The rotation detection device 70 detects if the rotation detection wheel 41 has turned a specific angle by detecting the spoke parts 412C of the rotation detection wheel 41 or the holes between the spoke parts 412C.

More specifically, the rotation detection device 70 uses a reflection or a transmission photosensor having an LED or other light-emitting device and a phototransistor or other photoreception device. In this embodiment of the invention a reflection photosensor is used, light is projected from the back cover side of the wheel 412, and the photosensor is set to receive the light that passes through the holes and is reflected by the main plate 3, or the light that is reflected by the spoke parts 412C, and rotation is detected from the output of this photosensor.

More specifically, in this embodiment of the invention light from the rotation detection device 70 that passes through the holes in the rotation detection wheel 41 and is reflected by the main plate 3 is picked up and detected by the photosensor. As a result, if the spoke parts 412C are formed at 45 degree intervals in the direction of rotation, the detection of reflected light passing through these holes switches between an on state in which the output of the photoreceptor is greater than or equal to a specified value, and an off state in which the output is less than the specified value, every time the rotation detection wheel 41 turns 45 degrees. Therefore, whether the rotation detection wheel 41 has turned 45 degrees can be detected by comparing photoreceptor output with a specified threshold value.

Note that a reflection photosensor requires a specific distance between the photoreception surface of the photosensor and the reflecting surface. Therefore compared with a configuration detecting reflection from the spoke parts 412C, detecting reflections from the main plate 3 has the advantage of enabling placing the photosensor closer to the main plate 3 and rendering the electronic timepiece 1 accordingly thinner.

Note that the rotation detection device 70 is not limited to detecting the movement (the angle of rotation) of the rotation detection wheel 41, and may directly detect the movement of the rotor 30 or rotor wheel 31, for example. More specifically, the rotation detection device 70 is disposed between the rotor 30 and the spiral spring 426, and may detect the movement of the rotor 30 or any member that rotates in conjunction with the rotor 30.

Furthermore, in addition to optical sensing devices, the rotation detection device 70 may use a spring or other type of mechanical contact, a magnetic sensor, or other type of sensor that can detect the movement (the amount of movement, such as the angle of rotation) of the rotor 30 or rotation detection wheel 41.

Time Adjustment Mechanism

A time adjustment mechanism 80 for adjusting the time by means of operating a crown is also disposed in the electronic timepiece 1 according to this embodiment of the invention. This time adjustment mechanism 80 is a typical mechanism known from the literature, and includes a winding stem 81 that turns when a crown attached thereto turns, a setting lever 82, a yoke 83, a clutch wheel 84, and a setting wheel 85.

When the crown is pulled out and the crown is turned with the clutch wheel 84 engaged with the setting wheel 85 due to the operation of the setting lever 82 and yoke 83, the day wheel 46 engaging the pinion 851 of the setting wheel 85 turns as the crown turns. Because the Geneva driven wheel 435 is prevented from turning by means of the Geneva drive wheel 431, the third wheel 44 and second wheel 45 do not turn, the second pinion 451 rotates slipping on the second wheel 45, and the position of the minute hand is adjusted. Because the hour wheel 47 also turns when the day wheel 46 turns, the position of the hour hand is also adjusted at the same time.

Timepiece Circuit Configuration

Figure 6:
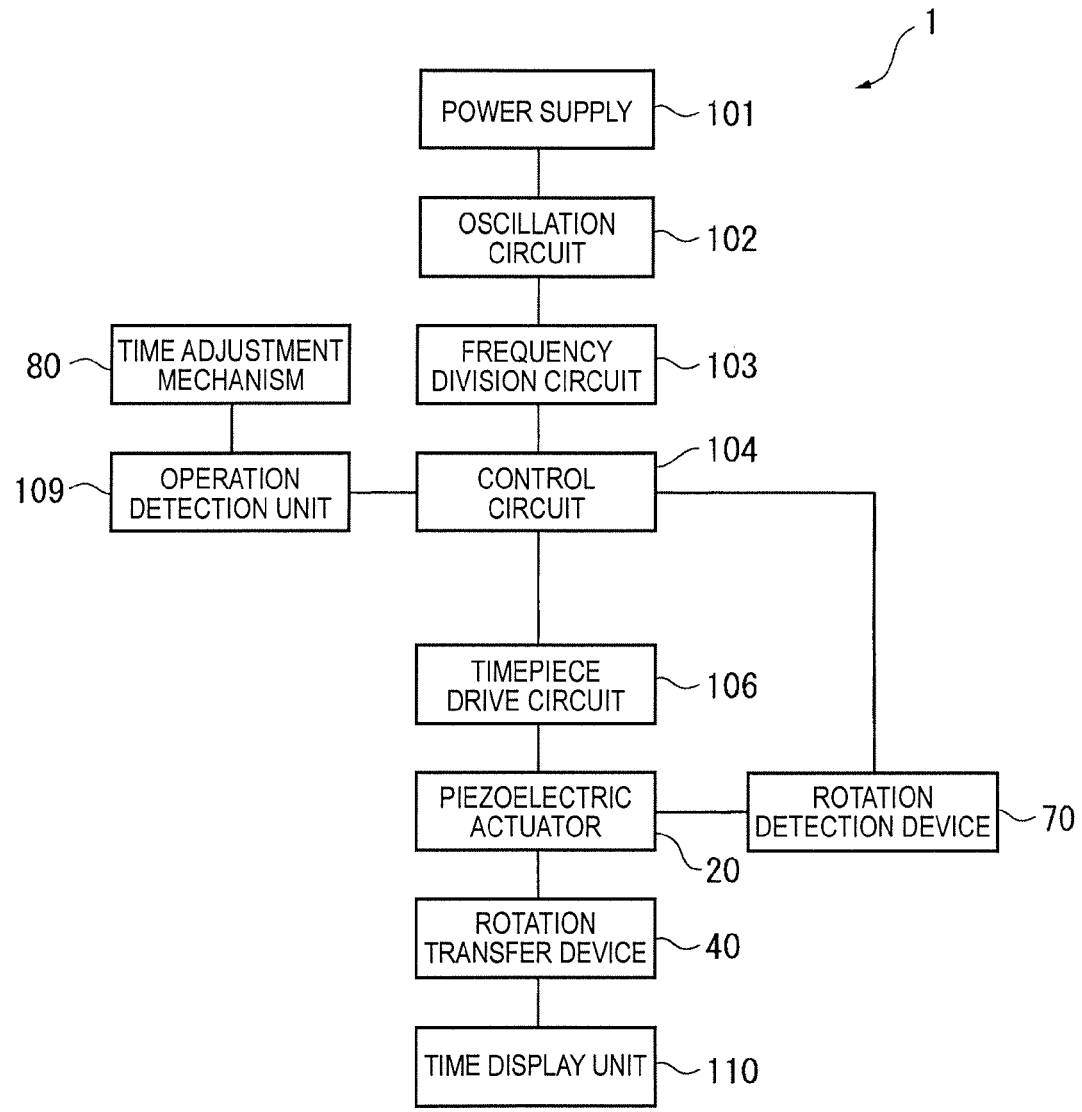
FIG. 6 is a block diagram showing the circuit configuration of the timepiece according to the first embodiment of the invention.

The circuit configuration of the timepiece 1 is described next with reference to FIG. 6.

The drive circuit of the timepiece 1 includes an oscillation circuit 102, a frequency division circuit 103, and a control circuit 104 that are driven by a power supply 101 including a battery 2 such as a primary battery or a secondary battery.

The oscillation circuit 102 has a reference oscillation source such as a quartz oscillator 6, and outputs an oscillation signal to the frequency division circuit 103.

The frequency division circuit 103 receives the oscillation signal input from the oscillation circuit 102, and based on this oscillation signal outputs a time reference signal (such as a 1-Hz signal).

The control circuit 104 counts the time based on the reference signal output from the frequency division circuit 103, and tells the timepiece drive circuit 106 to output a timepiece drive signal according to the timepiece specifications.

For example, to advance the movement in steps at 1-second intervals, such as when the timepiece 1 has an hour hand, a minute hand, and a second hand, the control circuit 104 controls the timepiece drive circuit 106 to output a timepiece drive signal once every second.

On the other hand, if the timepiece 1 is a two hand timepiece having an hour hand and a minute hand as in this embodiment of the invention, and the minute hand is advanced 3 times at 20-second intervals, the control circuit 104 controls the timepiece drive circuit 106 to output the timepiece drive signal time once every 20 seconds.

The control circuit 104 is connected to the rotation detection device 70 described above, and controls operation of the timepiece drive circuit 106 triggered by the detection signal output from the rotation detection device 70.

When the detection signal is output from the rotation detection device 70, that is, when the rotor 30 is detected to have moved a specific amount, the control circuit 104 controls the timepiece drive circuit 106 to stop outputting the drive signal, that is, applies control that stops the piezoelectric actuator 20.

For example, when the second hand is moved in steps at a 1-second interval, the control circuit 104 instructs the timepiece drive circuit 106 to output a drive signal every second. In this situation the rotation detection device 70 is set to detect when the rotor 30 has rotated a specific angle corresponding to the minute hand moving the distance of 1 minute, that is, 6 degrees, and when the rotation detection device 70 detects that the rotor 30 has rotated this specific angle, the control circuit 104 instructs the timepiece drive circuit 106 to stop outputting the drive signal. As a result, the piezoelectric actuator 20 drives the second hand at a 1-second interval to move the distance of one second.

When the minute hand is advanced 3 times at a 20-second interval such as in a two-hand timepiece, the control circuit 104 instructs the timepiece drive circuit 106 to output a drive signal every 20 seconds. In this configuration the rotation detection device 70 is set to detect rotation of the rotor 30 equal to the specific angle corresponding to the minute hand moving the amount of 20 seconds or 3 times, and when the rotation detection device 70 detects that the rotor 30 has moved this specific angle, the control circuit 104 causes the timepiece drive circuit 106 to stop outputting the drive signal.

An operation detection unit 109 for detecting operation of the time adjustment mechanism 80, such as the crown or a button, is also connected to the control circuit 104. When the operation detection unit 109 detects a specific operation of the time adjustment mechanism 80, the operation detection unit 109 outputs a corresponding detection signal to the control circuit 104. Based on the signal from the operation detection unit 109, the control circuit 104 instructs the timepiece drive circuit 106 to output the drive signal, that is, to start driving the piezoelectric actuator 20, or to stop outputting the drive signal, that is, to stop driving the piezoelectric actuator 20.

For example, when the crown is pulled out to adjust the time, the movement of the hands must be stopped. Therefore, when the operation detection unit 109 outputs a detection signal indicating the crown was pulled out, the control circuit 104 outputs a control signal for stopping driving the piezoelectric actuator 20 to the timepiece drive circuit 106. When the operation detection unit 109 outputs a detection signal indicating that the crown was pushed in, the control circuit 104 outputs a control signal to start driving the piezoelectric actuator 20 to the timepiece drive circuit 106.

A drive control device that controls driving the piezoelectric actuator 20 is thus rendered by the control circuit 104.

The timepiece drive circuit 106 receives control signals from the control circuit 104, and outputs drive signals to the piezoelectric actuator 20. More specifically, the timepiece drive circuit 106 applies a drive voltage of a specific frequency to and drives the piezoelectric elements 22 of the piezoelectric actuator 20 by means of an AC signal (pulse signal).

It should be noted that the method of controlling the drive frequency of the piezoelectric actuator 20 is not specifically limited. As taught in Japanese Unexamined Patent Appl. Pub. JP-A-2006-20445, for example, a method of driving the piezoelectric actuator 20 reliably by causing the frequency of the drive signal supplied to the piezoelectric elements 22 to sweep (change) through a wide range including the drivable frequency range may be used. Alternatively, as taught in Japanese Unexamined Patent Appl. Pub. JP-A-2006-33912, a method that changes the frequency of the drive signal so that the phase difference of the frequency of the drive signal supplied to the piezoelectric elements 22 and the detection signal acquired from the oscillation state of the piezoelectric elements 22 goes to a specified target phase difference suitable for driving the piezoelectric actuator 20 may be used. Further alternatively, the piezoelectric actuator 20 may be driven using a fixed frequency preset according to the temperature.

Further alternatively, a detection electrode to which voltage is not applied may be disposed to the piezoelectric elements 22 of the piezoelectric actuator 20, and the detection signal output from this detection electrode may be fed back to the control circuit 104 to control the frequency of the drive signal. This detection signal enables the control circuit 104 to check the drive status of the piezoelectric actuator 20, and enables feedback control of the drive signal frequency.

The output of the piezoelectric actuator 20 is transmitted through the rotation transfer device 40 as described above.

The rotation transfer device 40 converts the rotational energy output from the piezoelectric actuator 20 to an amount of movement suitable for displaying the time, and transmits this movement to the time display unit 110 (hands), that is, the time information display unit. In this embodiment of the invention a speed-increasing wheel train is rendered from the rotor wheel 31 to the rotation detection wheel 41 and Geneva drive wheel 431, and a speed-reducing wheel train is rendered from the Geneva driven wheel 435 through the third wheel 44, second wheel 45, day wheel 46, and hour wheel 47. As a result, the movement of the piezoelectric actuator 20 (rotation of the rotor 30) is converted at a specific speed increasing/reducing ratio to the movement of the time display.

Operation of the Piezoelectric Drive Device when Starting

The operation of starting the piezoelectric drive device is described next.

First, when a drive signal (drive voltage) is applied by the timepiece drive circuit 106 to the vibrator 21 of the piezoelectric actuator 20 when the piezoelectric actuator 20 is stopped, the vibrator 21 vibrates and the rotor 30 turns. Rotational energy is thus transmitted from the rotor 30 through the rotor wheel 31 and rotation detection wheel 41 to the pinion 421.

The spindle 422 and spring engaging member 423 rotate in conjunction with rotation of the pinion 421, the spiral spring 426 is thereby wound up and elastically deformed, and the transmitted rotational energy is stored as elastic energy in the spiral spring 426.

When winding the spiral spring 426 starts, the elastic energy stored in the spiral spring 426 is weak. As a result, the rotational energy applied from the spiral spring 426 to the Geneva drive wheel 431 is low and the Geneva drive wheel 431 remains stopped.

However, when the elastic energy stored in the spiral spring 426 increases and the rotational energy applied to the Geneva drive wheel 431 reaches a specific level, the Geneva drive wheel 431 starts turning.

However, as described above, the rotational energy of the Geneva drive wheel 431 is not transmitted to the Geneva driven wheel 435 from when the Geneva drive wheel 431 starts turning until a finger 432 thereof contacts a tooth 436 of the Geneva driven wheel 435. Therefore, in order to make the Geneva drive wheel 431 turn, the rotational energy applied from the spiral spring 426 must only be of a magnitude equal to the load equal to the load from the inertial moment of the Geneva drive wheel 431 plus the bearing load, and is not affected by the bearing load or the load from the inertial moments of the rotating bodies from the Geneva driven wheel 435 to the hands. The time lag from when piezoelectric actuator 20 drive starts until the Geneva drive wheel 431 turns can therefore be made very short.

When the Geneva drive wheel 431 rotates approximately 120 degrees from the start of rotation, a finger 432 contacts a tooth 436 of the Geneva driven wheel 435, and the Geneva driven wheel 435 starts turning. Note that to make the Geneva driven wheel 435 turn, rotational energy equal to the combined load of the load from the inertial moments of the rotating bodies (the Geneva driven wheel 435, third wheel 44, second wheel 45, day wheel 46, hour wheel 47, and each of the hands in this embodiment of the invention) and the bearing load of each of these rotating bodies is required.

Therefore, if this specified rotational energy cannot be applied to the Geneva driven wheel 435 when the finger 432 of the Geneva drive wheel 431 contacts the tooth 436 of the Geneva driven wheel 435, the Geneva drive wheel 431 stops, the spiral spring 426 is wound and the elastic energy stored, and when the rotational energy applied by this elastic energy becomes equal to or greater than this specified level, the Geneva drive wheel 431 and Geneva driven wheel 435 start turning.

When the finger 432 of the Geneva drive wheel 431 contacts the tooth 436 of the Geneva driven wheel 435, the Geneva drive wheel 431 turns the specified angle, and the finger 432 and Geneva driven wheel 435 disengage, the Geneva driven wheel 435 stops even if the Geneva drive wheel 431 continues turning.

For example, if the speed-increasing ratio from the rotor wheel 31 to the rotation detection wheel 41 is 6 times and the rotor 30 and rotor wheel 31 rotate 7.5 degrees, the rotation detection wheel 41 rotates 45 degrees. Because the spoke parts 412C of the rotation detection wheel 41 are located at 45 degree intervals, the rotation detection device 70 outputs a detection signal every time the rotation detection wheel 41 turns 45 degrees.

Furthermore, because the speed-increasing ratio from the rotation detection wheel 41 to the Geneva drive wheel 431 is 4 times in this embodiment of the invention, the Geneva drive wheel 431 turns 180 degrees when the rotation detection wheel 41 turns 45 degrees. When the Geneva drive wheel 431 turns 180 degrees, rotation of the Geneva driven wheel 435 is restricted and the Geneva driven wheel 435 cannot turn while the Geneva driven wheel 435 is in contact with the Geneva drive wheel 431 through the limiting range (120 degrees in this embodiment of the invention), but the Geneva driven wheel 435 turns 72 degrees through the drive range (60 degrees in this embodiment of the invention) in which the finger 432 is in contact with the tooth 436 of the Geneva driven wheel 435, and then stops.

When the rotation detection device 70 detects that the rotation detection wheel 41 turned 45 degrees, the piezoelectric actuator 20 stops as a result of the detection signal output therefrom.

When the Geneva driven wheel 435 turns 72 degrees, the second pinion 451 to which the minute hand is attached rotates 3 degrees and the hour wheel 47 to which the hour hand is attached rotates approximately 0.17 degree as a result of the speed-reducing wheel train from the Geneva driven wheel 435 to the hour wheel 47. Therefore, by outputting a drive signal from the timepiece drive circuit 106 and driving the piezoelectric actuator 20 at a 20-second interval, and stopping the piezoelectric actuator 20 when the rotation detection wheel 41 turns 45 degrees, the minute hand and hour hand can be moved in steps at a 20-second interval and the time can be indicated.

Effect

The effect of this embodiment of the invention is described next.

(1) In a rotation transfer device 40 that transmits rotational energy output from a piezoelectric actuator 20, an elastic device 42 that stores rotational energy from the piezoelectric actuator 20 as elastic energy, and a rotation limiting device that is composed of a Geneva drive wheel 431 and a Geneva driven wheel 435, rotates the Geneva driven wheel 435 intermittently, and limits the angle of rotation of the Geneva driven wheel 435 to a specific angle, are disposed on the same path. More specifically, the rotor, the elastic device, and the rotation limiting device are disposed on the same path (a serial path) that transmits rotational energy. As a result, the starting load of the piezoelectric actuator 20 is the bearing load and the load from the inertial moments of rotating bodies including the rotor 30, the rotor wheel 31, the rotation detection wheel 41, the pinion 421, and the spindle 422 that are before the spiral spring 426 on the rotation transfer path, and the bearing load and the load from the inertial moments of the rotating bodies from the Geneva drive wheel 431 to the hands do not act on the piezoelectric actuator 20. As a result, the load applied when the piezoelectric actuator 20 starts can be reduced, starting performance is improved, and power consumption can be reduced.

The hands of an analog timepiece in particular have a large inertial moment, and the shapes of the hands differ according to the design (model) of the timepiece. As a result, the inertial moment of the hands differs according to the model of the timepiece, and power consumption therefore also changes with drive methods according to the related art. This means that the battery life also changes in a timepiece that is driven by a battery.

By providing a spiral spring 426 according to this embodiment of the invention, however, the load from the inertial moment of the hands does not act on the piezoelectric actuator 20, the effect of change in the inertial moment of the hands can be cancelled, low power drive is possible, and changes in battery life due to model changes can be prevented.

In addition, disc-shaped hands having a larger inertial moment than conventional hands can also be used, and the freedom of timepiece design can be improved.

(2) By using a Geneva mechanism, which is a type of non-reversing gear transfer mechanism, as the rotation limiting device 43, the angle of rotation of the Geneva driven wheel 435 can be limited to a specific angle, which is specifically 72 degrees in this embodiment of the invention, while transmitting rotational energy from the piezoelectric actuator 20 to the driven rotating body side through the Geneva drive wheel 431 and Geneva driven wheel 435. As a result, it is not necessary to render in a timepiece 1 according to this embodiment of the invention a first transfer path for transmitting the rotational energy of a rotor to a rotation limiting device without passing through the elastic device, and a second transfer path for transferring the rotational energy of the rotor to the elastic device, as taught in Japanese Unexamined Patent Appl. Pub. JP-A-2008-245505. The design limitations on the electronic timepiece 1 are thus reduced, and design and manufacturing are simplified.

In addition, because the rotor 30 is rotated in one specific direction by the vibrator 21, the elastic energy stored by the rotational energy transmitted from the rotor 30 is stored in the same one specific direction, and the spiral spring 426 can easily and efficiently store the elastic energy.

Yet further, when the rotor 30 is turned by the vibrator 21 in the one specific direction and the direction opposite thereto, and the Geneva drive wheel 431 is also turned in both directions, setting the position of the Geneva driven wheel 435 in the direction of rotation becomes more difficult because of the backlash in the meshing of the Geneva drive wheel 431 and the Geneva driven wheel 435. However, because the rotor 30 turns in one specific direction and after turning is stopped by the vibrator 21 in this embodiment of the invention, there is no such backlash effect and the angle of rotation of the Geneva drive wheel 431 is therefore stable. As a result, the Geneva driven wheel 435 can be reliably turned a specific angle, and the Geneva driven wheel 435 can simultaneously be reliably prevented from turning the Geneva drive wheel 431.

(3) A further problem with the technology taught in JP-A-2008-245505 is that the elastic energy of a spiral spring must be stored in an elastic device on a second transfer path until restriction by the rotation limiting device is released, and a load is therefore always applied when the piezoelectric actuator 20 is started.

However, because rotation of the Geneva drive wheel 431 is not specifically limited when the piezoelectric actuator 20 starts in this embodiment of the invention, the load applied when the piezoelectric actuator 20 starts can be reduced compared with JP-A-2008-245505, and power consumption can be reduced accordingly.

(4) Because the amplitude of the piezoelectric actuator 20 can be driven to a specific amplitude and the rotor speed can be increased to a desired speed in a short time, and the startup time can be shortened, by providing a spiral spring 426 and reducing the starting load on the piezoelectric actuator 20, power consumption can be further reduced.

(5) Because the rotation of the Geneva driven wheel 435 is restricted by the Geneva drive wheel 431 while the teeth 436 and 437 are in contact with the limiting part 433 of the Geneva drive wheel 431, shaking of the hands can be suppressed when an external shock acts on the hands, such as when the timepiece 1 is dropped.

In addition, because a spiral spring 426 is provided, even if the shock of being dropped is applied from the Geneva driven wheel 435 to the Geneva drive wheel 431, the force of impact is buffered by the spiral spring 426 and can be prevented from being transmitted to the piezoelectric actuator 20 side, and operation of the piezoelectric actuator 20 can be stabilized.

Yet further, because rotation of the Geneva driven wheel 435 can be limited on the Geneva drive wheel 431 side, a separate limiting means for limiting rotation of the third wheel 44, for example, does not need to be provided for adjusting the time by operating the crown, and the parts count can be reduced.

(6) Because a spiral spring 426 is provided, great displacement can be easily assured by increasing the number of winds in the spiral spring 426, and the spiral spring 426 can be provided without particularly increasing the installation space compared with a configuration that uses a U-shaped spring or cantilever spring.

In addition, because a spiral spring 426 is provided, great displacement can be assured as described above, and substantially constant elastic energy can be produced irrespective of the displacement of the spiral spring 426. Therefore, because the Geneva drive wheel 431 receives substantially constant elastic energy from the spiral spring 426 irrespective of the size of any external shock, operation of the Geneva drive wheel 431 and the Geneva driven wheel 435 can be stabilized.

Yet further, even if shock is applied from the hands, the shock can be received by the rotation limiting device 43, the spiral spring 426 does not need to absorb the force, and the elastic force of the spiral spring 426 does not need to be set high. As a result, the load applied by the spiral spring 426 when the piezoelectric actuator 20 starts up can be reduced, and the piezoelectric drive device 10 can be driven with less power.

(7) The Geneva drive wheel 431 has fingers 432 for causing the Geneva driven wheel 435 to turn disposed 180 degrees apart. As the Geneva drive wheel 431 turns 180 degrees, a finger 432 engages the Geneva driven wheel 435 and causes the Geneva driven wheel 435 to turn while the Geneva drive wheel 431 rotates through the 60 degree drive range. The range of the remaining 120 degrees is the limiting range in which the limiting part 433 contacts the teeth 436 and 437 of the Geneva driven wheel 435 and restricts rotation of the Geneva driven wheel 435.

As a result, because rotation of the Geneva driven wheel 435 remains limited after the finger 432 and Geneva driven wheel 435 disengage even if the Geneva drive wheel 431 overruns due to the attenuating oscillation of the vibrator 21 and the inertia of the rotor 30 after the rotation detection device 70 detects that the rotation detection wheel 41 rotated a specific angle (45 degrees) when the piezoelectric actuator 20 is driven, and driving the piezoelectric actuator 20 is stopped, the Geneva driven wheel 435 can be driven intermittently and the angle of rotation can be kept constant (72 degrees in this embodiment of the invention). As a result, the movement of the hands to which rotation of the Geneva driven wheel 435 is transmitted can be held constant, and the positioning precision of the hands that are moved in steps can be assured.

(8) Because the piezoelectric elements 22 is rectangular, the piezoelectric drive device 10 can be rendered even thinner.

(9) The distance the hands move can be accurately controlled because the rotation detection device 70, that is, the rotation detection wheel 41, detects the movement of the rotor 30. The reason for this is described next.

Because the vibrator 21 of the piezoelectric actuator 20 and the rotor 30 transfer torque by means of friction, accurately setting the amount of rotor 30 rotation by controlling the drive time of the piezoelectric actuator 20 is difficult. In this embodiment of the invention the rotor 30, that is, the hands, can be moved accurately because the movement of the rotor 30 and the directly driven rotation detection wheel 41 is detected by the rotation detection device 70, and drive stops when the rotation detection device 70 detects that the rotor 30 has moved a specific amount. In addition, by disposing the rotation detection wheel 41 between the rotor 30 and the elastic device 42 (particularly the spiral spring 426), rotation of the rotor 30 can be detected before the rotational energy of the rotor 30 is stored as elastic energy in the spiral spring 426. Rotation of the rotor 30 due to driving the piezoelectric actuator 20 can therefore be more accurately detected, and the rotor 30 and hands can be moved more precisely than when the rotation detection wheel 41 is disposed on the back side of the elastic device 42 (the opposite side to the rotor).

Embodiment 2

Figure 7:
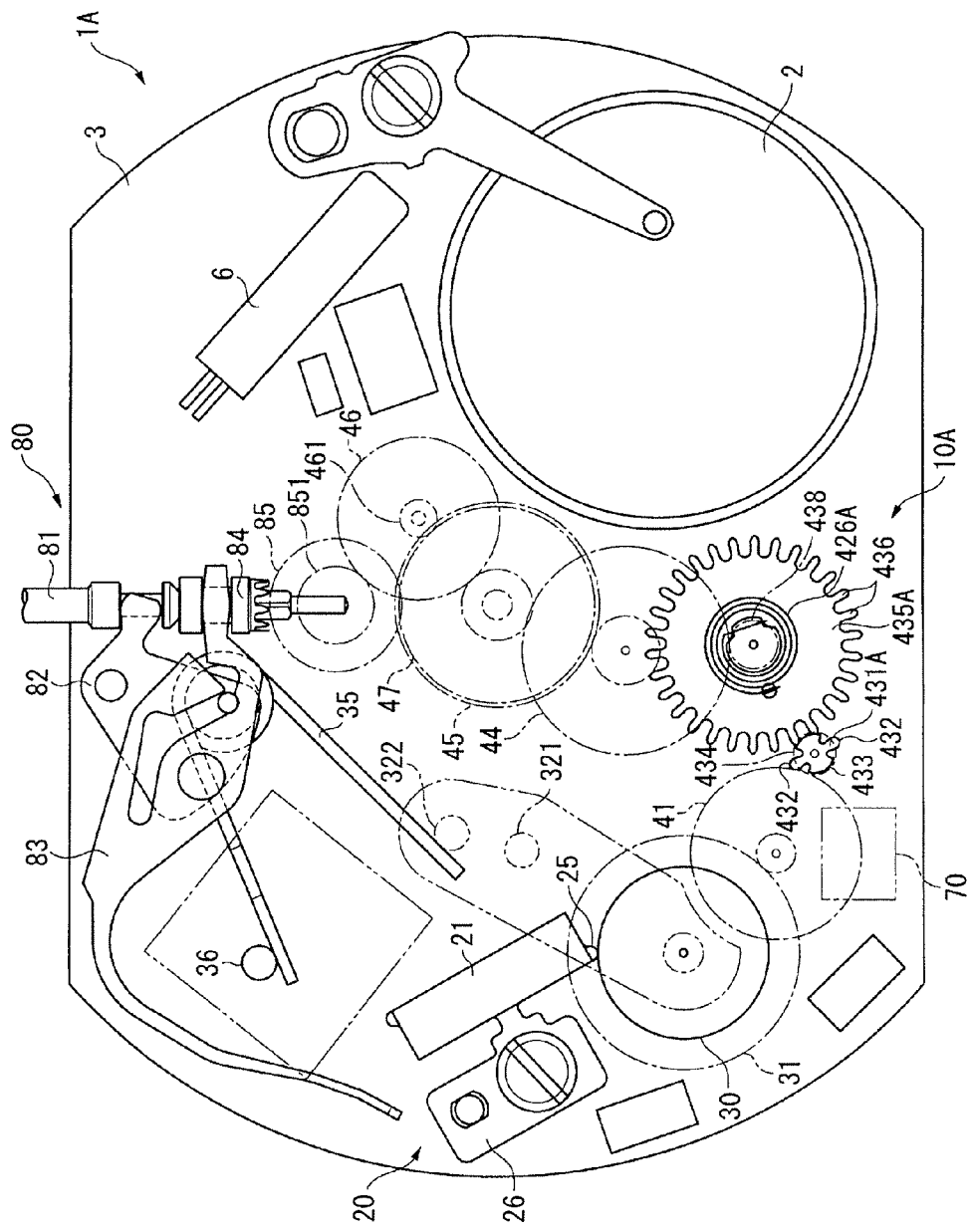
FIG. 7 is a plan view showing the main parts of a timepiece according to a second embodiment of the invention.

A piezoelectric drive device 10A in a timepiece 1A according to a second embodiment of the invention is described next with reference to FIG. 7.

In the first embodiment of the invention, the rotational energy of the piezoelectric actuator 20 is stored as elastic energy in the spiral spring 426 of the elastic device 42 in the rotation transfer device 40, and the Geneva drive wheel 431 and the Geneva driven wheel 435 are then made to rotate using this elastic energy.

In this second embodiment of the invention, the Geneva drive wheel 431A and the Geneva driven wheel 435A are rotated by the rotational energy of the piezoelectric actuator 20, and the spiral spring 426A is wound by the rotation of the Geneva driven wheel 435A.

More specifically, in the second embodiment of the invention the rotor 30, the rotation limiting device, and the elastic device are disposed so that the rotational energy of the rotor 30 is transferred through the rotation limiting device composed of the Geneva drive wheel 431A and Geneva driven wheel 435A to the spiral spring 426A of the elastic device. The rotor 30, the rotation limiting device, and the elastic device thus render a serial path that transmits the rotational energy of the rotor 30.

More specifically, rotation of the rotation detection wheel 41 that is rotated by the rotor 30 is transmitted to a pinion 434 that rotates in unison with the Geneva drive wheel 431A. Although the size differs, the Geneva drive wheel 431A has fingers 432 formed 180 degrees apart, and the period between the fingers 432 renders a limiting part 433 similarly to the Geneva drive wheel 431 of the first embodiment.

The Geneva driven wheel 435A has teeth 436 formed around the outside, rotation is limited when two teeth 436 contact the limiting part 433, and the Geneva driven wheel 435A rotates a specific angle when the finger 432 of the Geneva drive wheel 431A contacts a tooth 436. Therefore, the Geneva mechanism in this second embodiment of the invention also enables the Geneva driven wheel 435A to intermittently turn a specific angle in conjunction with rotation of the Geneva drive wheel 431A. Because the Geneva driven wheel 435A cannot turn after the Geneva driven wheel 435A rotates this specific angle, the rotational position of the Geneva driven wheel 435A is set. The Geneva driven wheel 435A is also prohibited from driving the Geneva drive wheel 431A at this time.

The outside circumference end of the spiral spring 426A is fastened to the Geneva driven wheel 435A, and the inside circumference end of the spiral spring 426A is fastened to a shaft member disposed in the center of the Geneva driven wheel 435A. The third wheel 44 is also turned by the pinion 438 that rotates in unison with this shaft member, and the second wheel 45, day wheel 46, and hour wheel 47 are driven by the third wheel 44 as described in the first embodiment. The Geneva driven wheel 435A is rotatably supported on this shaft member. In this embodiment of the invention, therefore, the pinion 438 that rotates in unison with the shaft member is disposed coaxially to the Geneva driven wheel 435A, is connected to the other end of the spiral spring 426A, and is also a transfer wheel.

Note that rotation of the rotation detection wheel 41 is detected by the rotation detection device 40 as described in the first embodiment. More specifically, rotation of the rotor 30 a specific amount is detected by the rotation detection device 40 detecting that the rotation detection wheel 41 has turned a specific amount, and driving the piezoelectric actuator 20 is stopped by detecting this.

When the rotor 30 of the piezoelectric actuator 20 rotates in this second embodiment of the invention, the Geneva drive wheel 431A is turned by the rotation detection wheel 41, and in conjunction therewith the Geneva driven wheel 435A intermittently rotates a specific angle.

The spiral spring 426A is wound and elastic energy is stored in conjunction with rotation of the Geneva driven wheel 435A. When the stored elastic energy equals or exceeds a specific amount, the pinion 438 rotates and causes the rotating bodies from the third wheel 44 to the hands to rotate.

This embodiment of the invention has substantially the same effect as the first embodiment described above.

Embodiment 3

A piezoelectric drive device 10B in a timepiece 1B according to a third embodiment of the invention is described next with references to FIG. 8-FIG. 11. Other than having piezoelectric drive device 10B instead of the piezoelectric drive device 10 used in the first embodiment of the invention, a timepiece 1B according to this third embodiment of the invention has the same configuration as the timepiece 1 described above. This piezoelectric drive device 10B has the same configuration as the piezoelectric drive device 10 described above except for having a rotation transfer device 40B instead of the rotation transfer device 40 in the first embodiment. Similarly to the rotation transfer device 40 described above, this rotation transfer device 40B transmits drive power produced by the piezoelectric actuator 20 to the minute hand and hour hand, and causes the minute hand and hour hand to rotate.

In the first embodiment of the invention the Geneva drive wheel 431 has two fingers 432 disposed 180 degrees apart, and when the rotor wheel 31 turns 7.5 degrees, the rotation of the rotor wheel 31 is accelerated by the rotation detection wheel 41 so that the Geneva drive wheel 431 rotates 180 degrees.

With the rotation transfer device 40B according to this embodiment of the invention, however, the Geneva drive wheel 509 has three fingers 5091 disposed 120 degrees apart. When the rotor wheel 31 turns 12 degrees, rotation of the rotor wheel 31 is accelerated by the rotation detection wheel 49 and the Geneva drive wheel 509 rotates 120 degrees. Described in further detail below, the third wheel 52 of the rotation transfer device 40B renders a torque slip mechanism.

Figure 8:
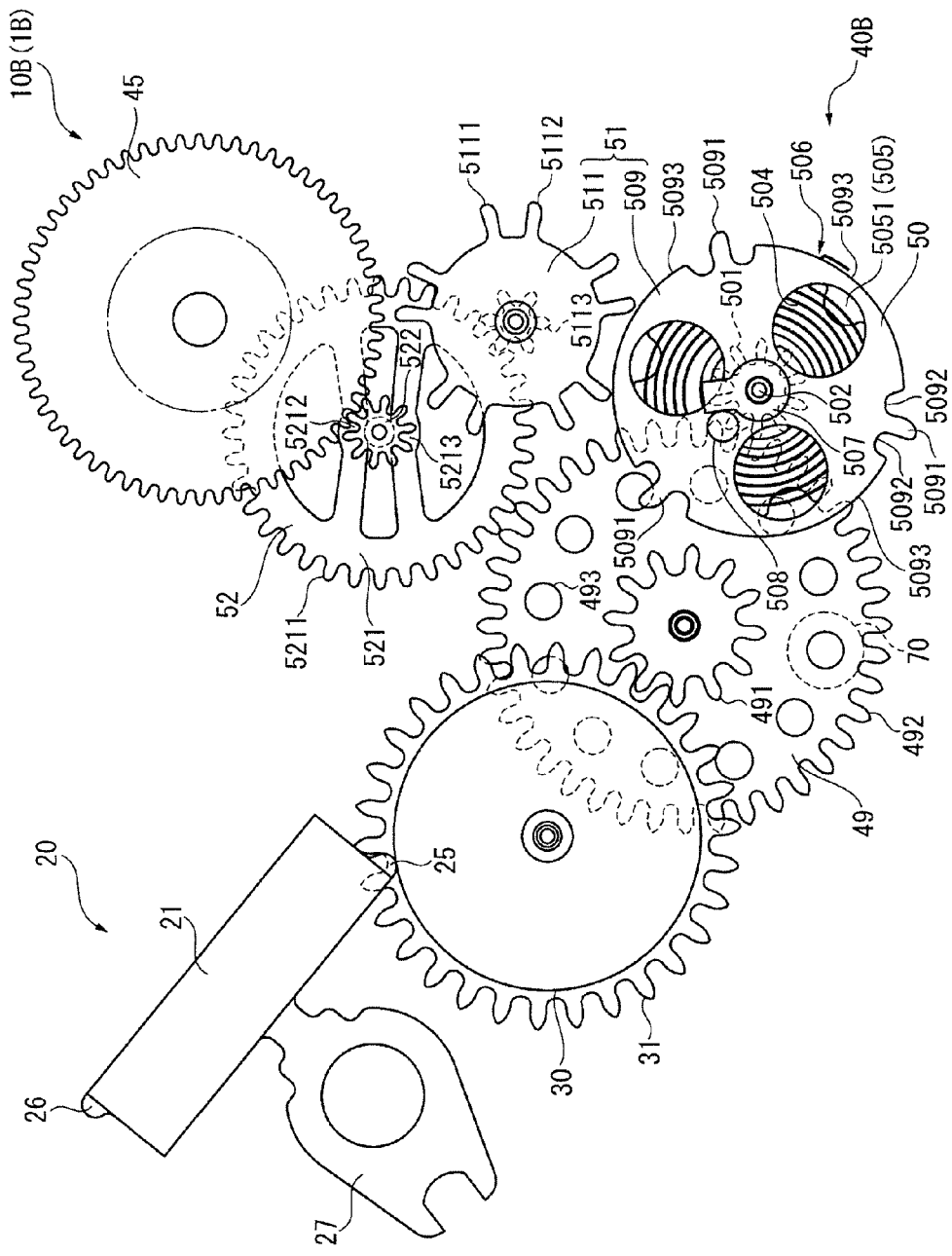
FIG. 8 is a plan view showing the rotation transfer device in a timepiece according to a third embodiment of the invention.

This rotation transfer device 40B has substantially the same configuration as the rotation transfer device 40 of the first embodiment, and differs therefrom in replacing the rotation detection wheel 41, elastic device 42, and rotation limiting device 43 of the first embodiment with a rotation detection wheel 49, elastic device 50, rotation limiting device 51, and third wheel 52 as shown in FIG. 8.

Rotation Detection Wheel

The rotation detection wheel 49 is disposed between the rotor 30 and the elastic device 50, accelerates the rotation of the rotor 30, and transfers the rotational energy of the rotor 30 to the elastic device 50. More specifically, the rotation detection wheel 49 renders a speed-increasing wheel train with a velocity ratio of 10 times disposed between the rotor 30 and the elastic device 50. This rotation detection wheel 49 has a pinion 491 that meshes with the rotor wheel 31, a wheel 492 that rotates coaxially to and in unison with the pinion 491, and a plurality of holes 493 that pass through the wheel 492. This rotation detection wheel 49 is supported freely rotatably by the main plate 3 and the train wheel bridge 4.

The plural holes 493 are disposed 30 degrees apart on a virtual circle of a specific radius centered on the rotational axis of the 491. These holes 493 are used by the foregoing rotation detection device 70 when detecting rotation of the rotation detection wheel 49.

Elastic Device

Figure 9:
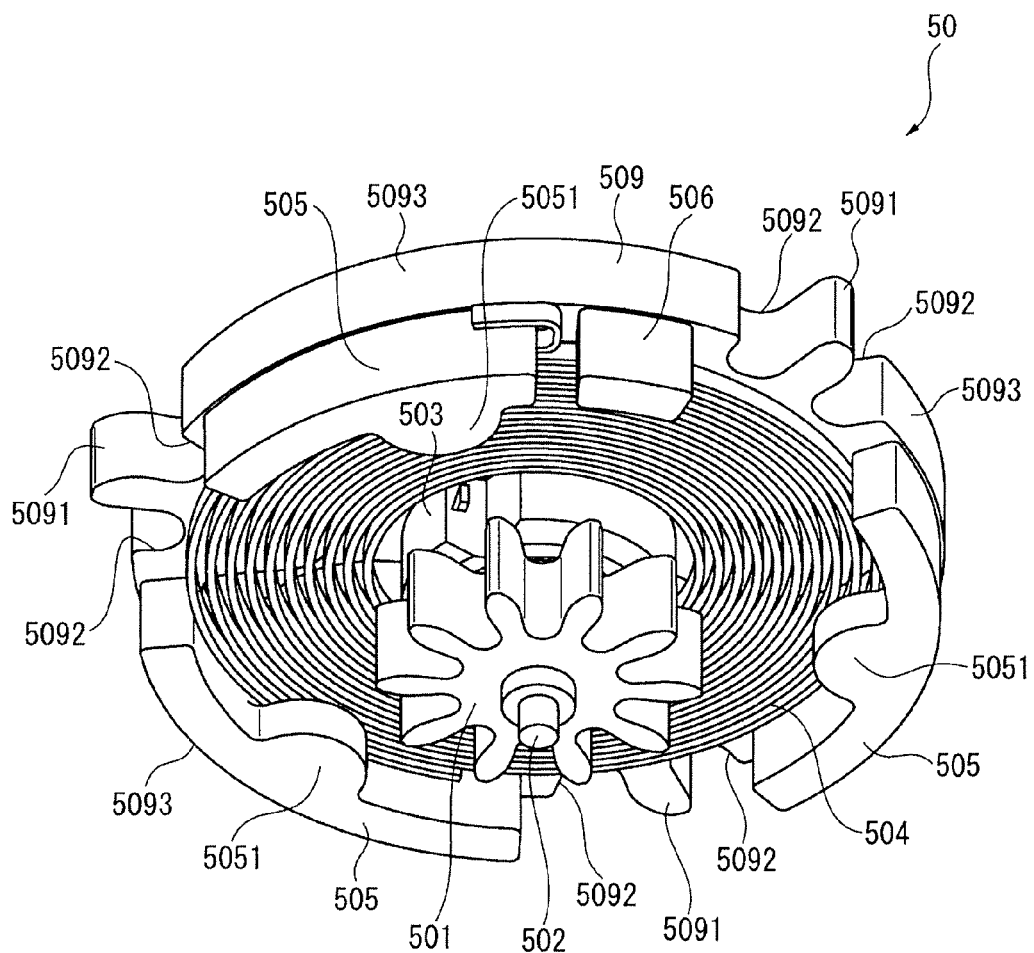
FIG. 9 is an oblique view showing the elastic device according to the third embodiment of the invention.
Figure 10:
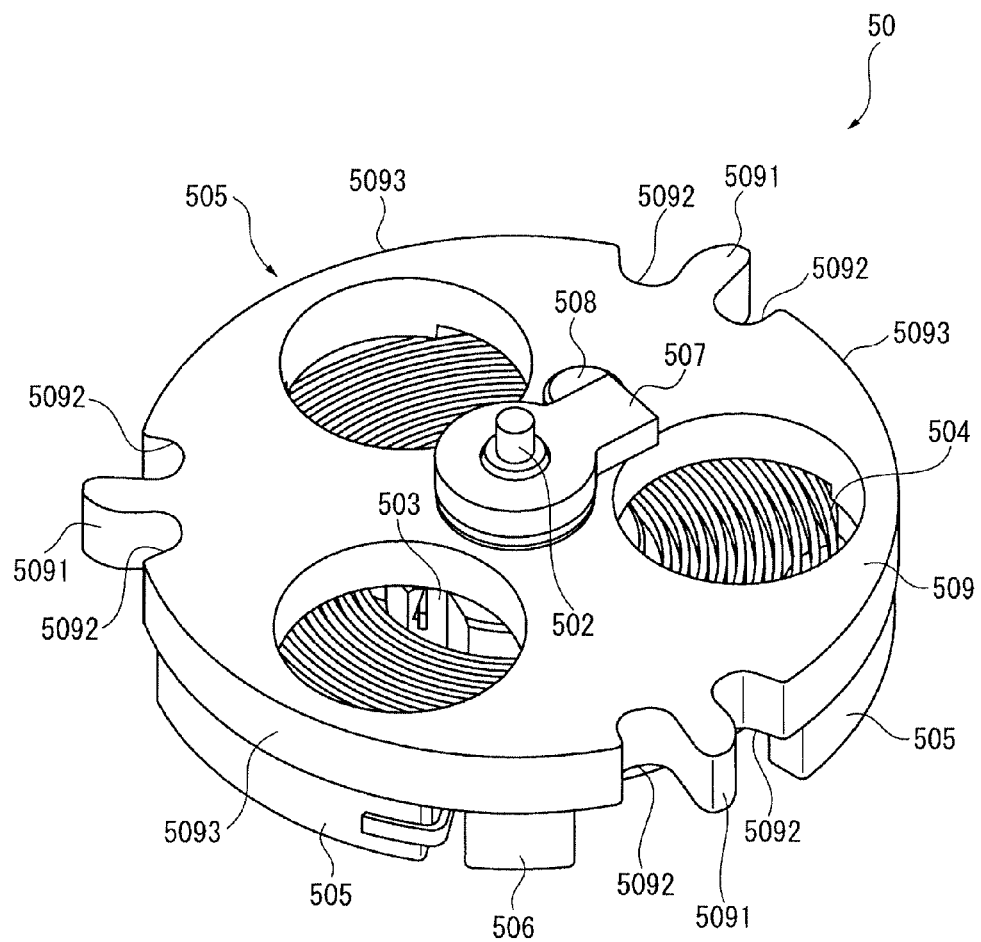
FIG. 10 is an oblique view showing the elastic device in the third embodiment of the invention.

FIG. 9 and FIG. 10 are oblique views of the elastic device 50, FIG. 9 showing the elastic device 50 from the opposite side as the side shown in FIG. 8, and FIG. 10 showing the elastic device 50 from the same side shown in FIG. 8.

The elastic device 50 converts rotational energy from the rotor 30 through the rotation detection wheel 49 to elastic energy stored in an internally disposed spiral spring 504, and also transmits the received rotational energy to the rotation limiting device 51. As shown in FIG. 8 to FIG. 10, the elastic device 50 has a pinion 501, a shaft 502, a spring catch 503, a spiral spring 504, spring retainers 505, a spring catch 506, a pressure unit 507, a pin 508, and the Geneva drive wheel 509.

As shown in FIG. 8 and FIG. 9, the pinion 501 meshes with the wheel 492 of the rotation detection wheel 49, and rotates in unison with the shaft 502 supported freely rotatably on the main plate 3 and the train wheel bridge 4.

As shown in FIG. 9 and FIG. 10, the spring catch 503 is rendered in unison with the shaft 502, and rotates in conjunction with rotation of the shaft 502. This spring catch 503 holds the inside circumference end part of the spiral spring 504 stored inside the elastic device 50 coaxially to the shaft 502.

As shown in FIG. 8 to FIG. 10, the spiral spring 504 is formed by winding flat spring stock in a counterclockwise spiral from the center to the outside circumference side when seen in plan view as in FIG. 8. As a result of the pinion 501, the shaft 502, and the spring catch 503 rotating clockwise in advance of the Geneva drive wheel 509, the spiral spring 504 is elastically deformed in the direction increasing the number of winds, and thus stores drive power transferred to the pinion 501 as elastic energy.

As shown in FIG. 9 and FIG. 10, the spring retainers 505 are disposed at three positions at equal intervals around the outside circumference of the spiral spring 504. The inside walls of these spring retainers 505 contact the outside surface of the spiral spring 504, and the spiral spring 504 is thereby held inside the elastic device 50. Note that each of these spring retainers 505 has a boss 5051 that protrudes toward the shaft 502. These bosses 5051 prevent the spiral spring 504 from escaping in the axial direction of the shaft 502.

As shown in FIG. 8 to FIG. 10, the spring catch 506 is disposed adjacent to one of the three spring retainers 505, and together with said adjacent spring retainer 505 holds the outside circumference end part of the spiral spring 504 surrounded by the spring retainers 505. When the outside circumference end part of the spiral spring 504 is thus held, and the shaft 502 and the spring catch 503 holding the inside circumference end of the spiral spring 504 are rotated in unison, the number of winds in the spiral spring 504 increases.

The pressure unit 507 and pin 508 fix the initial deflection position of the spiral spring 504.

More specifically, as shown in FIG. 8 and FIG. 10, the pressure unit 507 is disposed to the shaft 502 on the opposite side to the pinion 501, and the pin 508 protrudes from the opposite side of the Geneva drive wheel 509 to the pinion 501. When the spiral spring 504 is set to the initial deflection (initial elastic deformation) position by the pressure unit 507 and the pin 508, the spiral spring 504 is engaged by the spring catch 503 and the spring catch 506.

The pressure unit 507 and the spring catch 503 are disposed in unison with the shaft 502, and hold the Geneva drive wheel 509 rotatably therebetween with a slight gap to the Geneva drive wheel 509 in the axial direction of the shaft 502.

The Geneva drive wheel 509 renders part of the elastic device of the invention, and is equivalent to a drive wheel used in the rotation limiting device of the invention.

As shown in FIG. 8 to FIG. 10, this Geneva drive wheel 509 is substantially round when seen in plan view, and has three sets each including a finger 5091 that protrudes to the outside from the outside surface and a pair of recesses 5092 that are recessed to the inside on opposite sides of each finger 5091 formed 120 degrees apart. These fingers 5091 and recesses 5092 engage the teeth 5111 and 5112 of the Geneva driven wheel 511 part of the rotation limiting device 51, and contribute to rotation of the Geneva driven wheel 511.

The curved outside surfaces between the fingers 5091 of the Geneva drive wheel 509 are formed as limiting parts 5093 that restrict rotation of the Geneva driven wheel 511.

Note that the Geneva drive wheel 509 includes the spring retainers 505, the spring catch 506, and the pin 508 molded in unison with each other from a plastic resin. Compared with a configuration in which discrete components are assembled together, this configuration reduces the parts count of the elastic device 50 and makes elastic device 50 assembly easier. This configuration also reduces the inertial moment of the elastic device 50 (particularly the Geneva drive wheel 509) when compared with a configuration using metal components. As a result, the thickness of the fingers 5091 can be increased with consideration for the meshing with the teeth 5111.

Rotation Limiting Device

The rotation limiting device 51 is disposed so that the rotational energy of the rotor 30 is transmitted through the elastic device 50. More specifically, the rotation limiting device 51, rotor 30, and elastic device 50 together render a serial transfer path for transferring rotational energy from the rotor 30. This rotation limiting device 51 includes the Geneva drive wheel 509 and the Geneva driven wheel 511 to which torque is transmitted from the Geneva drive wheel 509. More specifically, the Geneva drive wheel 509 is part of the elastic device 50 and the rotation limiting device 51.

As shown in FIG. 8 the Geneva driven wheel 511 has teeth 5111 formed at five locations 72 degrees apart in the direction of rotation on the outside circumference surface, a tooth 5112 corresponding to each of the teeth 5111, and a pinion 5113 disposed to a center shaft.

The gap between each tooth 5111 and the tooth 5112 positioned on the counterclockwise side of that tooth 5111 is a small gap of approximately 20 degrees, and the gap to the tooth 5112 positioned in the direction of tooth 5111 rotation is a large gap of approximately 50 degrees.

Figure 11:
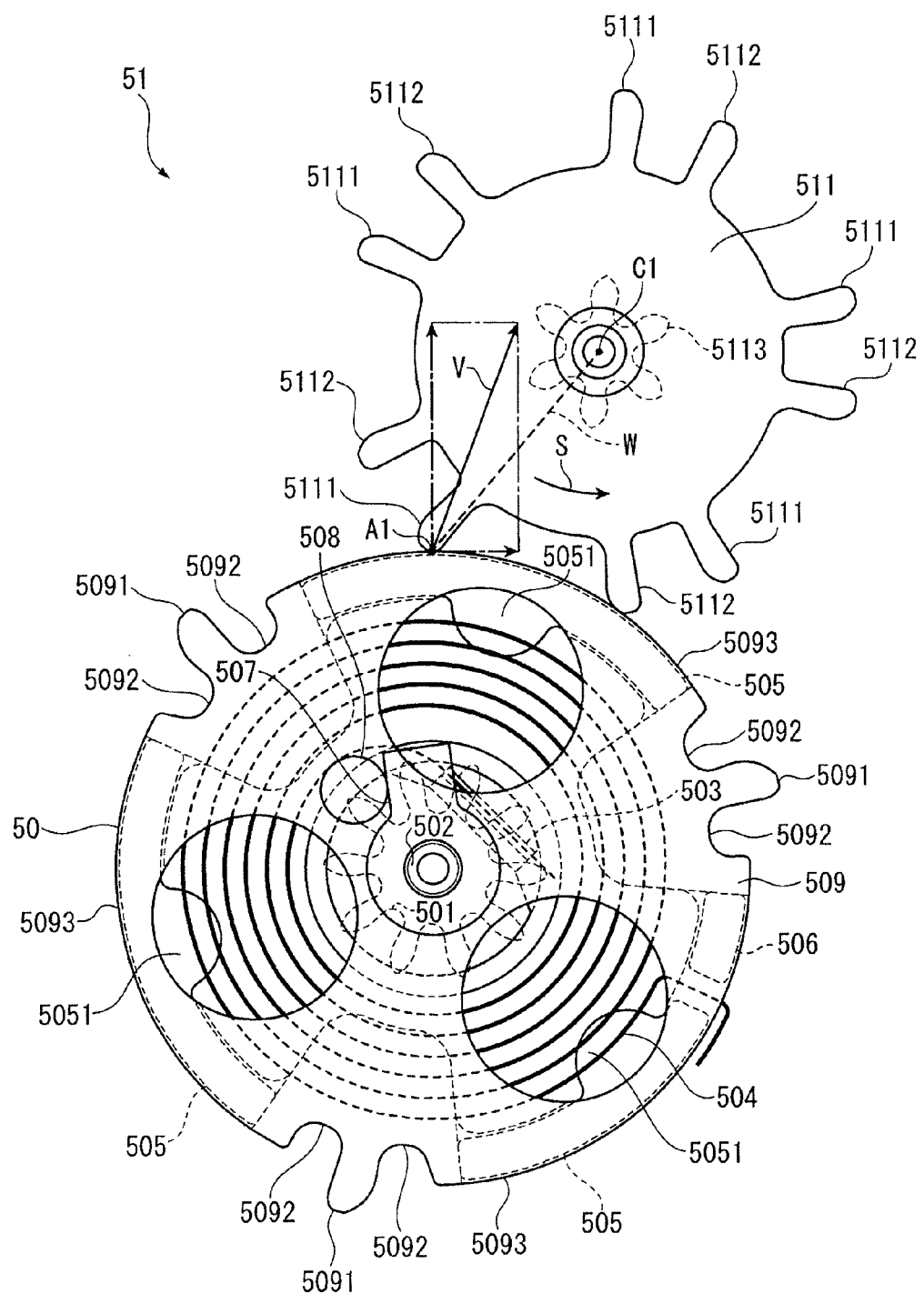
FIG. 11 is a plan view showing the elastic device and rotation limiting device in the third embodiment of the invention.

FIG. 11 shows the Geneva drive wheel 509 and Geneva driven wheel 511. More specifically, FIG. 11 shows when rotation of the Geneva driven wheel 511 is restricted by a tooth 5111 of the Geneva driven wheel 511 touching a limiting part 5093 of the Geneva drive wheel 509.

As shown in FIG. 11, when two teeth 5112 and 5111 on opposite sides of one of the foregoing large gaps are in contact with the limiting part 5093 of the Geneva drive wheel 509, the Geneva driven wheel 511 cannot turn in either the direction of rotation or the direction of counter-rotation. More specifically, rotation of the Geneva driven wheel 511 is restricted by the Geneva drive wheel 509.

Rotation of the Geneva driven wheel 511 is restricted until the Geneva drive wheel 509 turns, a tooth 5111 fits into a recess 5092 of the Geneva drive wheel 509 on the direction of rotation side, and a finger 5091 contacts the tooth 5111. More specifically, in this embodiment of the invention rotation of the Geneva driven wheel 511 is restricted until the Geneva drive wheel 509 rotates, the engaged finger 5091 separates from the tooth 5111, and the Geneva drive wheel 509 turns 120 degrees.

When the Geneva drive wheel 509 then rotates further from the position where a finger 5091 of the Geneva drive wheel 509 contacts a tooth 5111 of the Geneva driven wheel 511, the Geneva driven wheel 511 also turns pushed by the finger 5091. Rotation of the Geneva driven wheel 511 then stops when the finger 5091 and the tooth 5111 separate.

More specifically, when the rotor 30 and rotor wheel 31 rotate 12 degrees and the Geneva drive wheel 509 rotates 120 degrees in this embodiment of the invention, the Geneva driven wheel 511 rotates according to rotation of the Geneva drive wheel 509 while the finger 5091 and the tooth 5111 are in contact (in the drive range). When a finger 5091 and a tooth 5111 are not engaged (in the movement-limiting range), the Geneva driven wheel 511 does not turn even if the Geneva drive wheel 509 does. The Geneva driven wheel 511 turns turns intermittently in conjunction with rotation of the Geneva drive wheel 509.

As described above, the Geneva driven wheel 511 rotates intermittently as a result of rotation from the Geneva drive wheel 509, and the angle of rotation is set to a specific angle (72 degrees). Even if the Geneva driven wheel 511 side turns, this rotation is limited by the Geneva drive wheel 509 and is not transmitted to the Geneva drive wheel 509 side. The Geneva drive wheel 509 and Geneva driven wheel 511 thus render a non-reversing gear transfer device, and render a rotation limiting device 51 whereby the Geneva driven wheel 511 turns 72 degrees when the Geneva drive wheel 509 turns 120 degrees, and when the Geneva driven wheel 511 turns, transfer of rotation from the Geneva driven wheel 511 to the Geneva drive wheel 509 is restricted.

Furthermore, similarly to the fingers 432 described above, the fingers 5091 are asymmetrical tooth forms having the distal ends thereof sloped in the direction of rotation of the Geneva drive wheel 509. As a result, when the finger 5091 contacts a tooth 5111, the finger 5091 pushes the tooth 5111 in the direction of rotation of the Geneva driven wheel 511 and the Geneva driven wheel 511 is driven rotationally.

Furthermore, while the finger 5091 contacts a tooth 5112 when the Geneva drive wheel 509 turns in the opposite direction, the finger 5091 pushes the tooth 5112 toward the center of rotation of the Geneva driven wheel 511 because the surface of the distal end of the finger 5091 on the opposite side as the side of the finger 5091 that contacts the tooth 5112 when the Geneva drive wheel 509 rotates forward is sloped, and rotation can therefore not be transmitted to the Geneva driven wheel 511.

Positioning of the Fingers and Teeth

As shown in FIG. 11, the positions of the fingers 5091 on the Geneva drive wheel 509 and the positions of the teeth 5111 on the Geneva driven wheel 511 are set so that when a tooth 5111 contacts the limiting part 5093 and rotation of the Geneva driven wheel 511 (in the direction of arrow S in FIG. 11) is limited, the direction in which force is applied to the tooth 5111 (the direction of arrow V in FIG. 11, that is, the friction angle) at the point of contact between the tooth 5111 and the limiting part 5093 is, at this point of contact A1, in the opposite direction to direction S, which is the direction of rotation of the Geneva driven wheel 511, relative to line W, which is the line connecting the point of contact A1 and the center of rotation C1 of the Geneva driven wheel 511.

As described above, it is necessary that the Geneva driven wheel 511 does not turn even if the Geneva drive wheel 509 turns while the tooth 5111 and the limiting part 5093 are touching. However, if the working direction of force applied to the tooth 5111 (the direction of arrow V, which is the working direction of the force determined by the force working tangentially to the direction of rotation of the Geneva drive wheel 509 at the point of contact A1, and the force working radially to the Geneva drive wheel 509) is to the side of direction S from line W, the tooth 5111 may ride onto (bite into) the limiting part 5093 in conjunction with rotation of the Geneva drive wheel 509. If this happens, the Geneva driven wheel 511 that should normally not rotate may become damaged and rotate freely.

However, by positioning the teeth 5111 and the limiting parts 5093 (that is, positioning the teeth 5111 and the fingers 5091) as described above so that the direction of force applied to the tooth 5111 contacting the limiting part 5093 (the direction indicated by arrow V) is in the direction opposite direction S relative to line W, the teeth 5111 can be prevented from thus riding onto (biting into) the limiting part 5093. Rotation of the Geneva driven wheel 511 can thus be reliably prevented when a tooth 5111 is in contact with the limiting part 5093 as a result of disposing the teeth 5111 72 degrees apart around the outside of the Geneva driven wheel 511, disposing the teeth 5112 offset 22 degrees to an opposite direction side to the S direction side of the teeth 5111, and disposing the fingers 5091 120 degrees apart around the outside of the Geneva drive wheel 509.

Configuration of Wheel Train Downstream from the Geneva Driven Wheel

As shown in FIG. 8, the third wheel 52 and second wheel 45 are disposed in series between the Geneva driven wheel 511 and the day wheel 46, and render a speed-reducing wheel train.

The third wheel 52 has a third transfer wheel 521 around the outside circumference of which teeth 5211 are formed, and a pinion 522 axially supported to the third transfer wheel 521. The third transfer wheel 521 meshes with the pinion 5113 of the Geneva driven wheel 511, and the pinion 522 meshes with the second wheel 45.

The third transfer wheel 521 has a pair of support ribs 5212 and 5213 that hold the rotating shaft of the pinion 522 therebetween. These support ribs 5212 and 5213 are formed to be elastically deformable, are pushed together from the outside to the center of the rotating shaft of the pinion 522, and assure a specific friction torque with the pinion 522. The third transfer wheel 521 and the pinion 522 therefore normally rotate in unison.

When the crown is operated to adjust the positions of the hands, a powerful rotational torque works on the pinion 522 of the second wheel 45 through the time adjustment mechanism 80. In this situation rotation of the Geneva driven wheel 511 is restricted by the Geneva drive wheel 509, and the support ribs 5212 and 5213 of the third transfer wheel 521 friction slip when the pinion 522 is turned with great force. As a result, applying a load in the opposite direction from normal to the upstream side of the third wheel 52 (such as the piezoelectric actuator 20 side) can be prevented.

When external shock is produced by, for example, dropping the timepiece 1, the minute hand attached in an unbalanced condition to the second pinion 451 of the second wheel 45, and the hour hand attached in an unbalanced condition to the hour wheel 47, are made to turn, and a high rotational torque could be applied through the second wheel 45 to the pinion 522. In this situation rotation of the Geneva driven wheel 511 is limited by the Geneva drive wheel 509, and rotation of the third transfer wheel 521 is locked. At the same time, the pinion 522 is held by friction without slipping between the support ribs 5212 and 5213. As a result, the minute hand and hour hand are held in the correct positions without moving therefrom even when subject to external interference. As a result, the hands will not move and the displayed time will not be changed even when external shock is applied.

Note that the specific friction torque of the support ribs 5212 and 5213 holding the pinion 522 therebetween is set so that when the crown is operated, the pinion 522 slips between the support ribs 5212 and 5213, but during normal operation and when an external shock is applied, the pinion 522 does not slip between the support ribs 5212 and 5213 and can rotate in unison with the third transfer wheel 521.

The configuration of the third wheel 52 thus described enables compatibility with the torque of a large minute hand, and can improve the freedom of design in minute hand selection.

More specifically, wheels that may be caused to turn idly as a result of a high torque load transferred from the minute hand conceivably include the second wheel 45 in addition to the third wheel 52. However, because the second wheel 45 and the third wheel 52 render a speed-reducing wheel train, the slip torque is higher when the slip torque is applied to the second wheel 45 than when the slip torque is applied to the third wheel 52. On the other hand, because slip torque can be set low when the slip torque is disposed to the third wheel 52, the third wheel 52 can be processed stably, freedom of design is increased in minute hand selection, and the freedom of timepiece 1B design is improved.

The timepiece 1B according to this embodiment of the invention has the same effect as the timepiece 1 described above.

Variations

It will be obvious to one with ordinary skill in the related art that the invention is not limited to the foregoing embodiments and can be modified and improved in many ways without departing from the scope of the accompanying claims.

For example, the rotation limiting device of the invention is not limited to a Geneva mechanism such as described above, and many be any device that can transmit rotational energy and limit the angle of rotation to a specific angle.

Note, further, that a speed-increasing wheel train is rendered by the configuration from the rotor 30 to the Geneva drive wheel 431 in this embodiment of the invention, but rotation may be transferred without acceleration.

In addition, a rotation detection wheel 41, 49 is disposed between the rotor wheel 31 and the elastic device 42, 50 in the foregoing embodiments, but the rotation detection wheel 41, 49 may be omitted. In this configuration it is sufficient if rotation can be detected at the rotor wheel 31 part, for example. Note, further, that the rotation detection wheel may be disposed to a transfer path other than the transfer path whereby rotational energy from the rotor wheel is transmitted to the elastic device and the rotation limiting device. Further alternatively, the rotation detection wheel may be disposed downstream from the elastic device.

In the first and second embodiments of the invention the fingers 432 of the Geneva drive wheel 431, 431A are disposed 180 degrees apart on the outside of the Geneva drive wheel 431, 431A, and in the third embodiment of the invention the fingers 5091 of the Geneva drive wheel 509 are disposed 120 degrees apart on the outside circumference of the Geneva drive wheel 509, but the invention is not so limited. For example, the fingers may be disposed 90 degrees apart, the interval between the fingers may be set appropriately, and the positions of the teeth on the Geneva driven wheel can be set appropriately according to the position of the fingers.

The third wheel 52 in the third embodiment of the invention has support ribs 5212, 5213 that hold the pinion 522 to impart slip torque to the third wheel 52, but the invention is not so limited. More specifically, the pinion 522 may be axially supported by a different configuration, and a configuration that imparts slip torque to the second wheel 45 is also conceivable.

In the foregoing embodiments of the invention driven rotating bodies rotate due to elastic energy from an elastic device, but the bodies that are driven by the elastic device may be non-rotationally driven. Non-rotationally driven as used herein refers to linear drive, linear bidirectional drive, and bidirectional drive on a curve, for example.

The piezoelectric drive device according to the invention is not limited to timepieces, and can also be used as a drive power source in other types of electronic devices. More specifically, electronic devices using the piezoelectric drive device according to the invention include, for example, measurement instruments that drive needle indicators using a piezoelectric drive device, and other types of electronic devices that drive a driven body such as a turntable. More particularly, the piezoelectric drive device according to the invention has superior magnetic resistance than a stepping motor, and can be widely used as a power supply where magnetic resistance is required.

The best modes and methods of achieving the present invention are described above, but the invention is not limited to these embodiments. More specifically, the invention is shown in the figures and described herein with particular reference to specific embodiments thereof, but it will be obvious to one with ordinary skill in the related art that the shape, material, number, and other detailed aspects of these configurations can be varied in many ways without departing from the technical concept or the scope of the object of this invention.

Therefore, description of specific shapes, materials and other aspects of the foregoing embodiments are used by way of example only to facilitate understanding the present invention and do not limit the scope of this invention, and descriptions using names of parts removing part or all of the limitations relating to the form, material, or other aspects of these embodiments are also included in the scope of this invention.

The entire disclosure of Japanese Patent Application Nos: 2009-005616, filed Jan. 14, 2009 and 2009-271567, filed Nov. 30, 2009 are expressed incorporated by reference herein.

What is claimed is:

1. A piezoelectric drive device comprising:
a piezoelectric actuator including a vibrator having piezoelectric element, and a rotor that is rotated in one specific direction by the vibrator; and
a rotation transfer device that transmits rotational energy from the rotor to a driven rotating body, includes an elastic device that stores rotational energy transmitted from the rotor as elastic energy, and a rotation limiting device that has a drive wheel and a driven wheel that rotates in conjunction with rotation of the drive wheel, allows the driven wheel to rotate a specific angle in conjunction with rotation of the drive wheel, and restricts driving the drive wheel from the driven wheel when the driven wheel rotates the specific angle,
the elastic device and the rotation limiting device being disposed so that rotational energy transmitted from the rotor is transmitted through the elastic device to the rotation limiting device,
the rotor, the elastic device, and the rotation limiting device rendering a serial path for transmitting rotational energy from the rotor to the rotation limiting device.

2. The piezoelectric drive device described in claim 1, wherein
the rotational energy of the rotor is transmitted to the elastic device and stored as elastic energy, and
the drive wheel of the rotation limiting device is rotationally driven by transfer of elastic energy stored in the elastic device.

3. The piezoelectric drive device described in claim 1, further comprising
a rotation detection wheel disposed between the rotor and the elastic device;

a rotation detection device that detects if the rotation detection wheel has rotated a specific angle; and a drive control device that stops output of drive signals that drive the piezoelectric actuator when the rotation detection device detects that the rotation detection wheel has turned a specific angle after piezoelectric actuator drive starts.

4. The piezoelectric drive device described in claim 3, wherein the rotation detection wheel is a wheel that increases a relative rotation speed of the rotor against the rotation detection wheel.

5. The piezoelectric drive device described in claim 1, wherein a speed-increasing wheel train is disposed between the rotor and the rotation limiting device, and a relative rotation speed of the rotor is increased by the speed-increasing wheel train and transmitted to the rotation limiting device, and a speed-reducing wheel train is disposed between the rotation limiting device and the driven rotating body, and rotation of the driven wheel of the rotation limiting device is slowed by the speed-reducing wheel train and transmitted to the driven rotating body.

6. The piezoelectric drive device described in claim 1, wherein the rotation limiting device is rendered by a non-reversing gear transfer device that does not transfer rotation from the driven wheel to the drive wheel, and the non-reversing gear transfer device is a Geneva mechanism including a Geneva drive wheel and a Geneva driven wheel.

7. The piezoelectric drive device described in claim 6, wherein the Geneva drive wheel has a finger that engages a tooth of the Geneva driven wheel and causes the Geneva driven wheel to rotate, and a limiting part that is contacted by a tooth of the Geneva driven wheel and stops the Geneva driven wheel from rotating, a driving range in which the finger contacts a tooth of the Geneva driven wheel and causes the Geneva driven wheel to rotate, and a limiting range in which the limiting part contacts a tooth of the Geneva driven wheel and stops rotation of the Geneva driven wheel, are disposed in the rotational range of the Geneva drive wheel, and the limiting range is set to an angle of rotation range that is greater than or equal to the driving range.

8. The piezoelectric drive device described in claim 1, wherein the elastic device has a spiral spring.

9. The piezoelectric drive device described in claim 1, wherein the rotation transfer device has a rotor transfer wheel to which rotation is transmitted from the rotor, the rotor transfer wheel and the drive wheel of the rotation limiting device are disposed to the same rotating shaft, and one end of the elastic device is engaged with the rotor transfer wheel, and the other end is engaged with the drive wheel.

10. The piezoelectric drive device described in claim 1, wherein the rotation transfer device has a transfer wheel that is disposed on the same rotating shaft as the driven wheel of the rotation limiting device, and one end of the elastic device is engaged with the driven wheel, and the other end is engaged with the transfer wheel.

11. An electronic device comprising:

the piezoelectric drive device described in claim 1; and a driven unit that is driven by the piezoelectric drive device.

12. The electronic device described in claim 11, wherein the driven unit is a time information display unit that displays time information kept by a timekeeping unit.

* * * * *